United States Patent
Tremblay et al.

(10) Patent No.: US 12,430,702 B2
(45) Date of Patent: Sep. 30, 2025

(54) LEARNING ROBOTIC TASKS USING ONE OR MORE NEURAL NETWORKS

(71) Applicant: Nvidia Corporation, Santa Clara, CA (US)

(72) Inventors: Jonathan Tremblay, Redmond, WA (US); Stan Birchfield, Sammamish, WA (US); Stephen Tyree, University City, MO (US); Thang To, Redmond, WA (US); Jan Kautz, Lexington, MA (US); Artem Molchanov, Bellevue, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/458,221

(22) Filed: Aug. 26, 2021

(65) Prior Publication Data
US 2021/0390653 A1    Dec. 16, 2021

Related U.S. Application Data

(63) Continuation of application No. 16/255,038, filed on Jan. 23, 2019.
(Continued)

(51) Int. Cl.
*G06K 9/00* (2022.01)
*B25J 9/16* (2006.01)
(Continued)

(52) U.S. Cl.
CPC .............. *G06T 1/0014* (2013.01); *B25J 9/161* (2013.01); *B25J 9/1661* (2013.01); *B25J 9/1697* (2013.01);
(Continued)

(58) Field of Classification Search
None
See application file for complete search history.

(56) References Cited

U.S. PATENT DOCUMENTS

2017/0316312 A1    11/2017    Goyal
2018/0029226 A1 *  2/2018    Dani ...................... G06V 40/20
(Continued)

OTHER PUBLICATIONS

U.S. Non-Final Office Action dated Jul. 29, 2020 from U.S. Appl. No. 16/255,038.
(Continued)

*Primary Examiner* — Wei Wen Yang
(74) *Attorney, Agent, or Firm* — Davis Wright Tremaine LLP

(57) ABSTRACT

Various embodiments enable a robot, or other autonomous or semi-autonomous device or system, to receive data involving the performance of a task in the physical world. The data can be provided as input to a perception network to infer a set of percepts about the task, which can correspond to relationships between objects observed during the performance. The percepts can be provided as input to a plan generation network, which can infer a set of actions as part of a plan. Each action can correspond to one of the observed relationships. The plan can be reviewed and any corrections made, either manually or through another demonstration of the task. Once the plan is verified as correct, the plan (and any related data) can be provided as input to an execution network that can infer instructions to cause the robot, and/or another robot, to perform the task.

20 Claims, 11 Drawing Sheets

Related U.S. Application Data

(60) Provisional application No. 62/620,938, filed on Jan. 23, 2018.

(51) Int. Cl.
```
G05B 13/00      (2006.01)
G06N 3/08       (2023.01)
G06T 1/00       (2006.01)
G06T 7/73       (2017.01)
G05D 1/00       (2006.01)
G05D 1/227      (2024.01)
```

(52) U.S. Cl.
CPC ............... *G05B 13/00* (2013.01); *G06N 3/08* (2013.01); *G06T 7/73* (2017.01); *G05D 1/0088* (2013.01); *G05D 1/0221* (2013.01); *G05D 1/227* (2024.01); *G06T 2207/20081* (2013.01); *G06T 2207/20084* (2013.01)

(56) References Cited

U.S. PATENT DOCUMENTS

2018/0349527 A1    12/2018   Li
2019/0213438 A1*   7/2019    Jones ............... G06V 20/10

OTHER PUBLICATIONS

U.S. Final Office Action dated Mar. 18, 2021 from U.S. Appl. No. 16/255,038.
Yang et al. ("Repeatable Folding Task by Humanoid Robot Worker Using Deep Learning", IEEE, Apr. 2017, p. 397-403)(Year 2017).
Abbeel et al., "Apprenticeship Learning via Inverse Reinforcement Learning," ICML, 2004, 8 pages.
Andriluka et al., "2D Humamn Pose Estimation: New Benchmark and State of the Art Analysis," CVPR, Jun. 2014, 8 pages.
Cao et al., "Realtime Multi-Person 2D Pose Estimation using Part Affinity Fields," 2016, 9 pages.
Deng et al. "Imagenet: A Large-Scale Hierarchical Image Database," ICLR, 2009, 8 pages.
Denil et al., "Programmable Agents," 2017, 15 pages.
Devin et al., "Learning Modular Neural Network Policies for Multi-Task and Multi-Robot Transfer," ICRA, 2016, 8 pages.
Duan et al., "One-Shot Imitation Learning," Advances in Neural Information Processing Systems, Dec. 4, 2017, 27 pages.
Feniello et al., "Program Synthesis by Examples for Object Repositioning Tasks," IROS, 2014, 8 pages.
Ferrari et al., "Progressive Search Space Reduction for Human Pose Estimation," CVPR, Jun. 2008, 8 pages.
Finn et al., "Guided Cost Learning: Deep Inverse Optimal Control via Policy Optimization," ICML, 2016, 10 pages.
Garnelo et al., "Towards Deep Symbolic Reinforcement Learning," 2016, 13 pages.
Gupta et al., "Aligned Image-Word Representations Improve Inductive Transfer Across Vision-Language Tasks," 2017, 11 pages.
Hausman et al., "Multi-Modal Imitation Learning from Unstructured Demonstrations using Genrative Adversarial Nets," 2017, 11 pages.
Ho et al., "Generative Adversarial Imitation Learning," NIPS, 2016, 9 pages.
Hu et al., "Visual Cues for Imminent Object Contact in Realistic Virtual Environment," Proceedings of the Conference on Visualization, 2000, 7 pages.
IEEE "IEEE Standard for Floating-Point Arithmetric", Microprocessor Standards Committee of the IEEE Computer Society, IEEE Std 754-2008, dated Jun. 12, 2008, 70 pages.
James et al., "Transferring End-to-End Visuomotor Control from Simulation to Real World for a Multi-Stage Task," Oct. 17, 2017, 10 pages.
Johnson et al., "CLEVR: A Diagnostic Dataset for Compositional Language and Elementary Visual Reasoning," CVPR, 2017, 10 pages.
Karpathy et al., "Deep Visual-Semantic Alignments for Genrating Image Descriptions," CVPR, Jun. 2015, 17 pages.
Ng et al., "Algorithms for Inverse Reinforcement Learning," Proceedings of the Seventeenth International Conference on Machine Learning, Jun. 2000, 8 pages.
Paul et al., "Temporal Grounding Graphs for Language Understanding with Accrued Visual-Linguistic Context," Proceedings of the Twenty-Sixth International Joint Conference on Artificial Intelligence, 2017, 9 pages.
Peyre et al., "Weakly-Supervised Learning of Visual Relations," 2017, 16 pages.
Pomerleau et al., "Efficient Training of Artificial Neural Networks for Autonomous Navigation," Neural Computation, 3(1): 1991, 10 pages.
Ross et al., "A Reduction of Imitation Learning and Structured Prediction to No. Regret Online Learning," AISTATS, Apr. 2011, 9 pages.
Ross et al., "Efficient Reductions for Imitation Learning," AISTATS, 2010, 8 pages.
Shen et al., "Weakly Supervised Dense Video Captioning," 2017, 12 pages.
Simonyan et al., "Very Deep Convolutional Networks for Large-Scale Image Recognition," Apr. 10, 2015, 14 pages.
Tobin et al., "Domain Randomization for Transferring Deep Neural Networks from Simulation to the Real World," IEEE/RSJ International Conference on Intelligent Robots and Systems (IROS), Mar. 20, 2017, pp. 23-30.
Vinyals et al., "Show and Tell: A Neural Image Caption Generator," CVPR, Jun. 2015, 9 pages.
Wei et al., "Convolutional Pose Machines," CVPR, 2016, 9 pages.
Winograd et al., "Procedures as a Representation for Data in A Computer Program for Understanding Natural Language," MIT, 1971, 461 pages.
Xu et al., "Neural Task Programming: Learning to Generalize Across Hierarchical Tasks," ICRA, Mar. 14, 2018, 8 pages.
Yang et al., "Articulated Human Detection with Flexible Mixtures-of-Parts," PAMI, 35(12): Dec. 2013, 13 pages.
Yang et al., "Repeatable Folding Task by Humanoid Robot Worker Using Deep Learning," IEEE Robotics and Automation Letters, Apr. 2017, 7 pages.

\* cited by examiner

LEARNING ROBOTIC TASKS USING ONE OR MORE NEURAL NETWORKS

CROSS-REFERENCE TO RELATED APPLICATIONS

This application is a continuation of U.S. patent application Ser. No. 16/255,038, filed Jan. 23, 2019, entitled "Learning Robotic Tasks Using One or More Neural Networks," which claims priority to U.S. Provisional Application Ser. No. 62/620,938, filed Jan. 23, 2018, entitled "Learning Human-Readable Plans from Human Demonstrations," which are hereby incorporated herein in their entirety for all purposes.

BACKGROUND

Robotic devices are being utilized to perform an increasing number and variety of tasks. Using conventional approaches, a programmer must spend a significant amount of time programming and testing a robot, or other automated device or object, to perform a physical task. This comes at a high cost, both in programming cost and robot downtime, that makes the use of robotic devices financially prohibitive for many potential users. Further, the expense requires significant usage time to recoup the costs, which limits the ability to make changes or add new tasks to be performed.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the learning of plans for a task to be performed. In particular, various embodiments enable a robot, or other autonomous or semi-autonomous device or system, to monitor the performance of a task in the physical world. Data, such as image data, representative of the performance can be provided as input to a perception network to infer a set of percepts about the task, which can correspond to relationships between objects observed during performance of the task. The percepts can be provided as input to a plan generation network, which can use the percepts to infer a set of actions as part of the plan. Each action can correspond to one of the relationships observed during the performance. In embodiments where the plan is human readable, a human can view the plan and make any corrections, either manually or through another demonstration of the task. Once the plan is verified as correct, the plan (and any related data) can be provided as input to an execution network that can infer instructions to cause the robot (or another robot) to perform the task.

Such an approach can generate human-readable programs from a real-world demonstration. One example system consists of a set of neural networks to perform the tasks associated with perception, program generation, and program execution. For perception, image-centric domain randomization leveraging convolutional pose machines can be utilized, which results in a vision-based network that can be applied to various cameras or sensors (either physical or virtual), without assumptions about the pose or the presence of specific background features in the scene. For program generation and execution, fully connected networks, despite their simplicity, generalize surprisingly well when considering relationships, states, and programs not encountered during training. Training individual networks separately facilitates component-wise testing, interpretability, and modularity.

Various other functions can be implemented within the various embodiments as well as discussed and suggested elsewhere herein.

Figure 1:
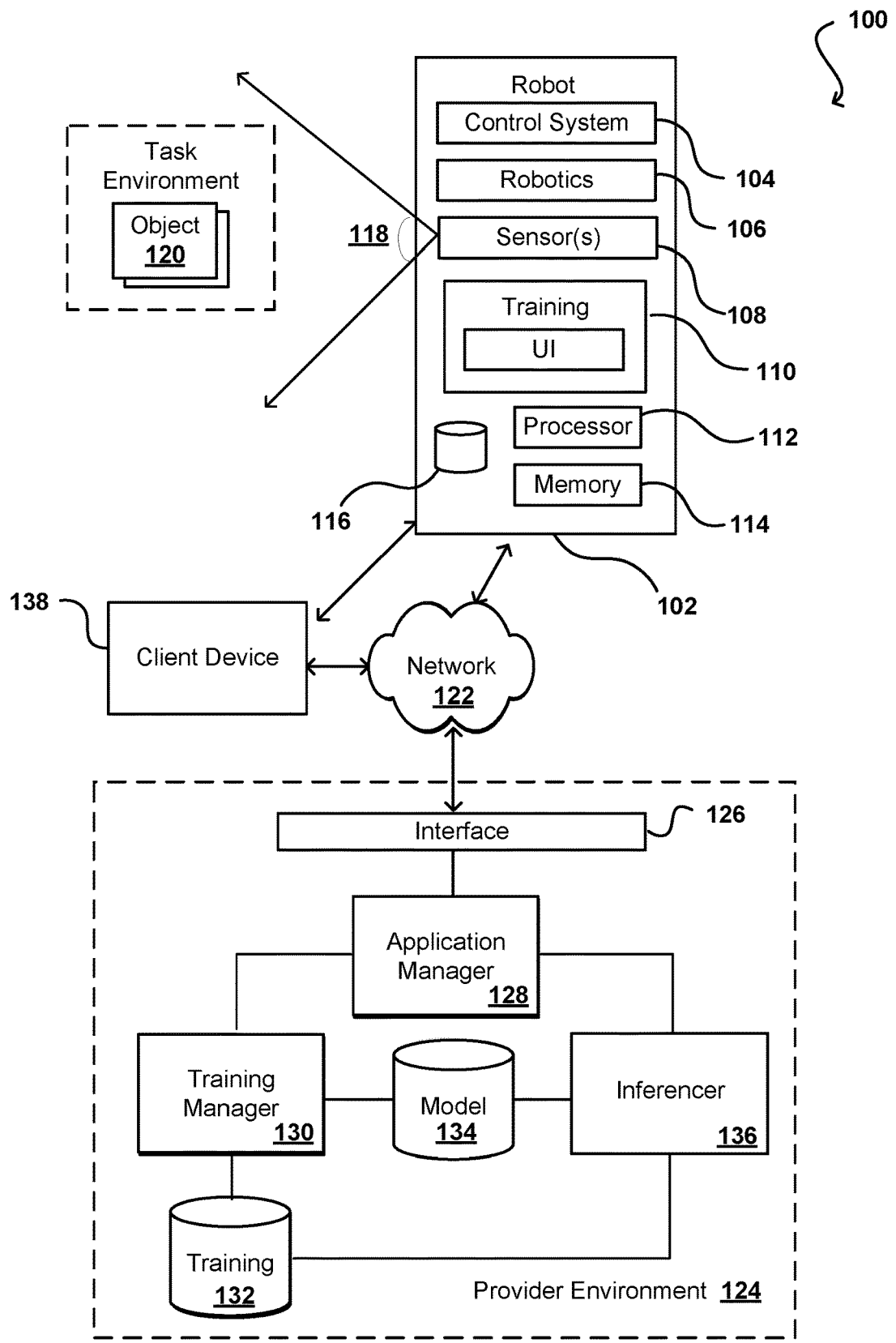
FIG. 1 an example system that can be utilized to implement aspects in accordance with various embodiments.

FIG. 1 illustrates an example environment 100 that can be utilized to implement aspects of the various embodiments. As mentioned, it might be the case that a user or other entity would like to train a robot 102, or other automated (or at least partially automated) device or object to perform a specific task, or set of tasks. The task may involve one or more objects 120 of one or more types that are located within what is referred to herein as a task environment, although in various embodiments the task could be performed at any appropriate location in the physical world. In many cases, it may be desirable to train the robot quickly and at low cost, in order to enable the robot to begin performing with little delay and at least relatively independent of the value of the task to be performed.

Approaches in accordance with various embodiments utilize the sensors 108 and other inputs or mechanisms of a robot, automated device, and/or computing system to capture or obtain data regarding the performance of a task in the physical world. This can include, for example, a person performing a task in a task environment involving one or more objects. In a manufacturing environment this might involve assembling two or more parts, while in a warehouse setting this might involve stacking objects or placing those objects on specific shelves. For a healthcare environment this might involve sanitizing a piece of medical equipment, while in a home environment this might involve emptying the dishwasher. Various other types of tasks can be performed as well within the scope of the various embodiments as would be apparent in light of the teachings and suggestions contained herein.

In this example, a user can provide an input to a robot 102 to capture data regarding a task to be performed. The instructions can be provided through an input mechanism on the robot 102, such as a touch screen, voice control, or input button, or can be provided through a client device 138 in communication with the robot, among other such options. The client device 138 can be any appropriate computing device, such as may include a desktop computer, notebook computer, smart phone, tablet computer, computer workstation, gaming console, and the like. The client device 138 may communicate with the robot 102 over a wired connection, such as a Universal Serial Bus (USB) connection, or a wireless connection, such as a Bluetooth® or near-field communication (NFC) connection. The client device 138 might also communicate with the robot 102 over at least one network 122. The at least one network 122 can include any appropriate network, including an intranet, the Internet, a cellular network, a local area network (LAN), or any other such network or combination thereof.

After receiving the instruction or request, the robot 102 can enter a training mode, for example, wherein the robot will activate one or more sensors 108 to attempt to capture data regarding the performance. This can include, for example, one or more cameras to capture images or video of the performance in the environment within a field of view 118 of the respective sensors. These can include standard digital cameras (i.e., cameras including CCD or CMOS sensors), stereoscopic cameras, infrared image sensors, structured light cameras, and the like. Other sensors or mechanisms can be utilized as well, as may include depth sensors, ultrasonic sensors, LIDAR, microphones, motion capture systems, or motion detectors, among others. As mentioned, at least some of these sensors or detection mechanisms can also be external to, or separate from, the robot in some embodiments. As the task is being performed, the sensors 108 can capture information, such as video and position data, representative of the objects 120 in the task environment. Once the task is completed, input can again be provided to the robot 102 using one or more mechanisms discussed or suggested herein.

Using a process such as those discussed herein, the robot 102 can then process the data to attempt to determine or define the task, such as to develop a plan that indicates what the robot understands the task to be. This can involve, for example, using a training module 110 on the robot itself, or sending the data across the at least one network 122 for processing, although at least some amount of pre-processing may be performed on the robot as well. The training application can be a machine learning (ML) application that utilizes machine learning for at least one aspect of the application functionality. At least some functionality may also operate on a remote device, networked device, or in "the cloud" in some embodiments. The robotic device can include at least one processor (e.g., a CPU or GPU) to execute the application and/or perform tasks on behalf of the application, and memory 110 for including non-transitory computer-readable instructions for execution by the processor. Data provided to, or generated via, the application 110 can be stored locally to local storage 112, such as a hard drive or flash memory, among other such options. If at least some of the data is to be processed remotely, the data can be sent to a target destination in a corresponding provider environment 124. The provider environment 124 can include any appropriate components for receiving requests and returning information or performing actions in response to those requests. As an example, the provider environment might include Web servers and/or application servers for receiving and processing requests, then returning data or other content or information in response to the request.

Communications received to the provider environment 124 can be received to an interface layer 126. The interface layer 126 can include application programming interfaces (APIs) or other exposed interfaces enabling a user, client device, or other such source to submit requests or other communications to the provider environment. The interface layer 126 in this example can include other components as well, such as at least one Web server, routing components, load balancers, and the like. Components of the interface layer 126 can determine a type of the request (or other communication), and can direct the request to the appropriate system or service. For example, if a communication relates to the training of a neural network, the communication can be directed to an application manager 128, which can be a system or service provided using various resources of the provider environment 124. The communication, or information from the communication, can be directed to a training manager 130, which can select an appropriate model or network and then train the model using relevant training data 132, which in some embodiments might be provided or specified by the received communication. Once a network is trained and successfully evaluated, the network can be stored to a model repository 134, for example, that may store different models or networks for different types of data or processing. If a request is received to the interface layer 126 that includes input for the application that requires processing, information for the request can be directed to an inference module 136 (referred to herein as a "inferencer"), system, or service that can obtain the corresponding trained network, such as a trained generative adversarial network (GAN) or convolutional neural network (CNN) as discussed herein, from the model repository 134 if not already stored locally. The inferencer 136 can take the input from the robot 102 and cause the input to be processed using the appropriate trained model(s) to generate one or more inferences.

In various embodiments the processor 112 (or a processor of the training manager 130 or inferencer 136) will be a central processing unit (CPU). As mentioned, however, resources in such environments can utilize GPUs to process data for at least certain types of requests. With thousands of cores, GPUs are designed to handle substantial parallel workloads and, therefore, have become popular in deep learning for training neural networks and generating predictions. While the use of GPUs for offline builds has enabled faster training of larger and more complex models, generating predictions offline implies that either request-time input features cannot be used or predictions must be generated for all permutations of features and stored in a lookup table to serve real-time requests. If the deep learning framework supports a CPU-mode and the model is small and simple enough to perform a feed-forward on the CPU with a reasonable latency, then a service on a CPU instance could host the model. In this case, training can be done offline on the GPU and inference done in real-time on the CPU. If the CPU approach is not a viable option, then the service can run on a GPU instance. Because GPUs have different performance and cost characteristics than CPUs, however, running a service that offloads the runtime algorithm to the GPU can require it to be designed differently from a CPU based service.

Once a plan is generated, such as may be inferenced from a plan generation model as discussed herein, that plan can be provided for confirmation, such as by a user. The plan can be at least partially human-readable, and can be sent to the client device 138, provided through a UI of the training program 110 executing on the robot, or otherwise provided. The user can view the plan to determine whether the plan accurately represents the task to be performed. If not, the user can instruct the robot to capture data for another performance of the task using the objects 120, or can manually correct the plan to correctly represent the task to be performed, among other such options. After the plan is verified, the plan and/or associated data can be processed using an execution neural network, for example, to generate a set of instructions executable by the robot 102 to perform the task. The execution neural network can perform the inference on the robot 102, on the client device 138, or using an inference 136 in the provider environment 124, among other such options. Once the instructions are generated, the instructions can be provided to the control system 104 of the robot, either directly or upon execution by the processor 112, etc. The control system can then manage the appropriate robotics 106 to perform the determined task. The robotics can be any appropriate automated, or at least partially automated, mechanism, as may include a robotic arm, gripper assembly, multi-link manipulator, end effector, motion control system, or other such physical hardware component, module, or sub-system that may be contained within, or connected in some way to, the robot 102 to perform one or more tasks as instructed.

Figure 2A:
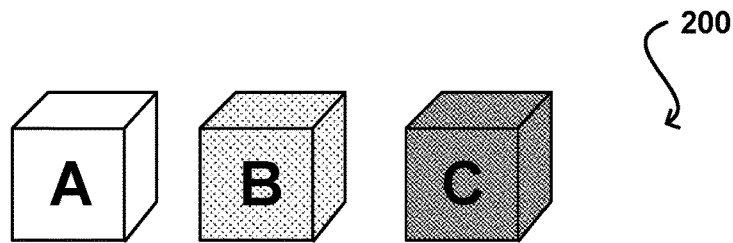
FIGS. 2A, 2B, 2C, and 2D illustrate views of an example physical task to be performed in accordance with various embodiments.
Figure 2B:
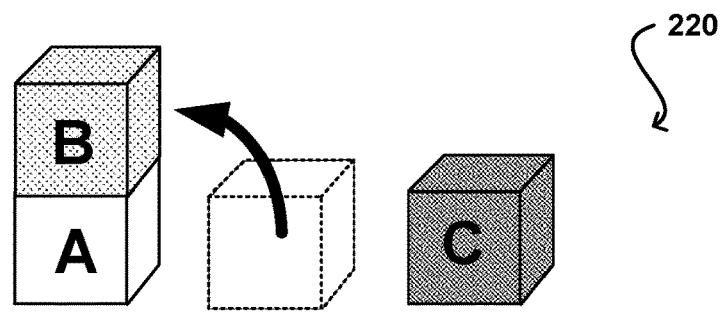
Figure 2C:
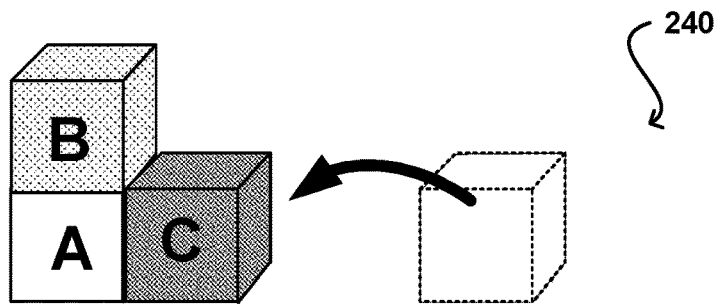

FIGS. 2A through 2C illustrate portions of a basic task that can be learned in accordance with various embodiments. As illustrated in the state 200 of FIG. 2A, there are three objects A, B, and C that are identifiable by their respective colors or other such aspects. During performance of the task, object B can be stacked on top of object A as illustrated in the state 220 of FIG. 2B. As a next action for the task, block C can be placed adjacent, and to the right of, block A as illustrated in the state 240 of FIG. 2C. A robot capturing image data representative of these actions could analyze the image data to determine orientation, location, relationship, and other information about the objects, such as will be described later herein with the approximation 260 illustrated in FIG. 2D. The information can then be used as discussed herein to generate, or infer, a corresponding plan. The plan can be a program, file, listing, database, or set of actions or instructions, which could include steps such as "Place Block B on Block A" followed by "Place Block C to the right of Block A." The plan can be readable by a machine in order to enable the plan to be executed, as discussed herein, and can also be at least partially human-readable in some embodiments to enable a user to confirm the contents of the plan before it is executed. In some embodiments the plan will be both completely machine- and human-readable, and in other embodiments the plan will be only machine readable, etc. The terminology used for the plan can come from a predetermined vocabulary in at least some embodiments, where a user has provided words to be used for specific types of actions, as well as names for specific objects, etc. A human user can review the plan to determine whether the plan is representative of the task, or matches the intended goals of the task. For example, if the plan instead said something like "Move Block B up one foot and to the left two feet," that step might be an accurate representation of what was observed, but may not accurately represent the task. For example, the initial relative positions between blocks might vary. Further, the important goal is that Block B ends up on Block A, not that Block B ends up in a specific location in the physical space. The ability to learn the goal can help the robot to be more flexible and make better decisions than when a robot is programmed to instead make a specific set of motions or actions regardless of the state of the environment. A human user can review the plan and either confirm or take action to correct or update the plan as discussed herein.

As mentioned, such an approach to learning and verifying tasks to be performed by a robot can enable a non-expert to train a robot a new task in a reasonable amount of time. The ability to train to have certain goals or outcomes, as opposed to providing instructions relating to specific trajectories in space, further enables the robot to be safer and more accurate as it can adjust to disturbances or changes in conditions of the environment.

Figure 3A:
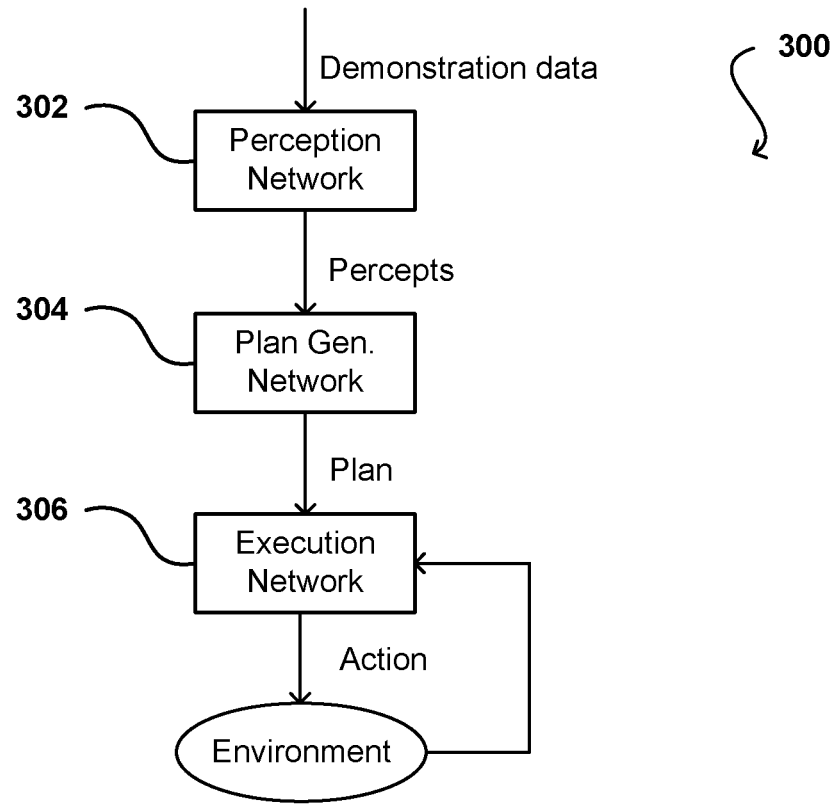
FIGS. 3A and 3B illustrate and example components that can be utilized to generate plans and enable robotic devices to perform tasks corresponding to those plans in accordance with various embodiments.

Approaches in accordance with various embodiments can utilize a set of three learning modules, which can each utilize machine learning in some embodiments, although other types, numbers, and arrangements of modules can be used as well within the scope of the various embodiments, involving machine learning, artificial intelligence, cognitive computing, statistical modeling, or another such approach. FIG. 3A illustrates one set of example components 300 that can be utilized in such a system. In this example, a perception network 302 can be a deep neural network that accepts the demonstration data captured of the performance, such as may include image, distance, and other data as discussed herein. The perception network can process the demonstration data to generate a set of observations or "percepts" about the task. As mentioned, this can include relationships among the objects or actions taken with respect to the objects throughout the performance. The percepts can then be fed to a plan generation network 304, which can be another deep neural network that can process the percepts to generate, or infer, a human-readable plan corresponding to the task. This plan can be provided to a user for confirmation, and can enable another performance or editing of the plan if one or more changes are required. Once the plan is confirmed, the plan (and any relevant related data) can be provided to an execution network 306, which can be a deep neural network capable of processing data for the plan and generating, or inferring, one or more robot-readable instructions (i.e., readable by a computer processor or control system) for performing one or more actions corresponding to the plan. The actions can then be provided to one or more robots in the environment for performing the action. It should be understood that the robot used to perform the action may not be the robot that learned the action, or the action may have been learned by a learning system separate from the robot. The actions can also be provided to other robots for performance as well within the scope of the various embodiments. In some instances, the plans provided to different robots may be modified by a human to cause the plan to be accurate for a specific robot, such as to change the type of an object that the robot is to use for the task, etc.

In some embodiments, the perception network 302 can include or utilize two neural networks. A first network is a deep neural network (DNN) trained for object detection. This DNN can be similar to a convolutional pose machine in some embodiments, in that it takes as input one or more images, or video frames, passes the image data through a series of convolutional layers and outputs a series of belief maps. The belief maps can have the same size and resolution of the input image(s) in some embodiment, with each pixel location in the belief map having a value corresponding to a probability that a feature of the object (such as a vertex of a cube) is located at the corresponding location. The number of belief maps produced can correspond to the number of features to be located, as well as the number of objects corresponding to the task. Post-processing of the belief maps can be performed in some embodiments to locate peaks in the belief maps, or coordinates where the probability is highest (at least locally).

The peak locations (e.g., pixel locations or coordinates) can be provided as input to a relationship inference network. The relationship inference network can utilize those coordinates, for example, to infer a probability map over the possible relationships. This can include relationships such as on top of, to the left of, in front of, halfway in front of, etc. The relationships can have any desired level of granularity, such as may specify "overlapping by one inch" for example. In the cube example of FIG. 2A, the object detection network could provide the peaks of those vertices in two-dimensional image coordinates, and the relationship inference network could take those vertex coordinates and output relationship data indicating that Cube B is on Cube A. The relationship data in some embodiments can be encoded in a discrete array, wherein all the possibilities are stored in rows and columns.

The object detection network can be a convolutional neural network that is trained on a set of training images, using domain randomization to overcome any reality gap resulting from the use of synthetic data. The relationship inference network can be a much smaller network that accepts as input a small number of coordinates and then produces a table that represents the relationships. The relationship inference network is a fully connected network that is smaller as it is dealing with a simpler problem than the object detection network. The use of synthetic training data enables a large amount of training data to be generated relatively quickly and cheaply.

The output of the relationship inference network can be provided to a program generation network. The program generation network can take as input all the relationship data and output a program indicating one or more actions that can be used to generate those relationships. For the state of FIG. 2B, the network could output an action such as "Put Block B on Block A." In one example the output of the relationship inference network is an array with a number of rows and columns corresponding to the number of objects, in order to determine the relative relationships between any pair of the objects. Within each cell can be a string of binary digits, with the number of digits related to the number of objects as well. With N objects there are at most N−1 steps in the program to arrive at the relationships in at least some embodiments.

The execution network can accept as input a version of the plan, which can correspond to a table of values (e.g., 0s and 1s) indicating the relationships between the various objects. Another input can be another table indicating the state that comes from the same perception network. The state can be output in real time, with output corresponding to the action. The action is thus one of a small number of possibilities. During execution of the program in a closed loop system, new image data is produced that can be used to perceive what is happening in the physical world, so any deviations can be detected and addressed accordingly.

In at least some embodiments a robot will have a set of pre-scripted behaviors, which may be provided in a library or encoded into the robot control system, among other such options. Once a plan or program is provided, the program can indicate the action to be taken and the appropriate pre-scripted behavior can be used to perform the action. Thus, if the action is to place one object on top of another, a specific pre-scripted behavior can be used to perform that action, which can include grabbing, moving, and releasing the object in a way that is appropriate for the type and version of robot. The learning in various embodiments thus is at the symbolic level and not at the robot joint level.

In some embodiments the objects can be located in six degrees of freedom using a computer vision-based approach. Such a process can determine the location and orientation of an object using three degrees of freedom of translation in space for location, and three degrees of freedom in rotation for orientation. Thus, a point such as a centroid might be defined for location and the rotation values would define the orientation at that location. There are many approaches that the perception engine can take to do determine these values, which can involve neural networks with some post-processing to extract the actual translation and orientation data. For objects where the shape is known and determinable, a two-dimensional image can be used to determine orientation. If the size of the object is known, the two-dimensional image can also be used to determine position without need for depth or distance data from a separate sensor.

Approaches in accordance with various embodiments thus can infer and execute human-readable programs from a real-world demonstration. Image-centric domain randomization can be used in some embodiments to train perception networks to predict in image space rather than world space, increasing the applicability of the learned networks to new scenarios. Leveraging convolutional pose machines, object cuboids can be reliably detected in images even when severely occluded, after training only on synthetic images. Using this representation a robot's world understanding can be augmented using neural networks that detect relationships between objects, generate plans, and determine actions to reproduce a real-world demonstration. In order for robots to perform useful tasks in real-world settings, it should be easy to communicate the task to the robot; this includes both the desired end result and any hints as to the best means to achieve that result. In addition, the robot should be able to perform the task robustly with respect to changes in the state of the world, uncertainty in sensory input, and imprecision in control output. Teaching a robot by demonstration is a powerful approach to solve these problems. With demonstrations, a user can communicate a task to the robot and provide clues as to how to best perform the task. In various embodiments, only a single demonstration should be needed to show the robot how to do a new task. As mentioned, however, a fundamental limitation of demonstrations is that they are concrete but the intent of the demonstration may be ambiguous. Concrete actions themselves are insufficient to answer such questions. Rather, abstract concepts are to be inferred from the actions.

Language, with its ability to capture abstract universal concepts, is a valid solution to this problem of ambiguity in demonstrations. By inferring a human-readable description of the task from the demonstration, a system can allow the user to verify that the demonstration was interpreted correctly by the system. A human-readable description of the task can also be edited by the user to fix errors in the interpretation. Finally, such a description enables the system to make better use of previous experience with similar objects and similar scenarios.

An example system can learn a human-readable program from a single demonstration in the real world. The learned program can then be executed in the environment with different initial conditions. A system can learn from a single demonstration in the real world, as real-world demonstrations are more natural, being applicable to a wider set of scenarios due to the reduced system complexity required, as compared to simulated systems. The system can generate human-readable plans, which enables the resulting plan to be verified by a human user before execution.

An example system relies on image-centric domain randomization for training the perception network. In contrast with a world-centric approach, an image-centric network can make fewer assumptions about the position of a sensor within the environment or the presence and visibility of fixed objects (such as a table), and is therefore portable to new situations without requiring retraining. In some embodiments a one-shot imitation learning-based approach can be leveraged. For example, simulation can be used to learn a network capable of watching a user demonstration and replicating it with a robot. Such a method can leverage a neural network architecture that extensively uses soft-attention in combination with memory. During an extensive training phase in a simulated environment, the network can learn to correctly repeat a demonstrated block stacking task. The complexity of the architecture, in particular the attention and memory mechanisms, supports robustness when repeating the demonstration. The ability to generate human-interpretable representations can be important for modularity and stronger generalization. Conventional approaches operate on a low-dimensional representation of the objects in the environment and train in simulation. A label-free low-dimensional representation of the world can be obtained by leveraging simulation-to-reality transfer. Domain randomization can be used for transferring a representation learned entirely in simulation. This approach has been successfully applied in several robotic learning applications. Improving upon this, approaches in accordance with various embodiments can acquire a more detailed description of the objects in a scene using object part inference, allowing the extraction of interpretable intermediate representations and inference of additional object parameters, such as orientation. Further, predictions can be made in image space, so that robust transfer to the real world requires only determining the extrinsic parameters of the robot's camera, for example, rather than needing to develop a simulated world to match the real environment before training.

Figure 3B:
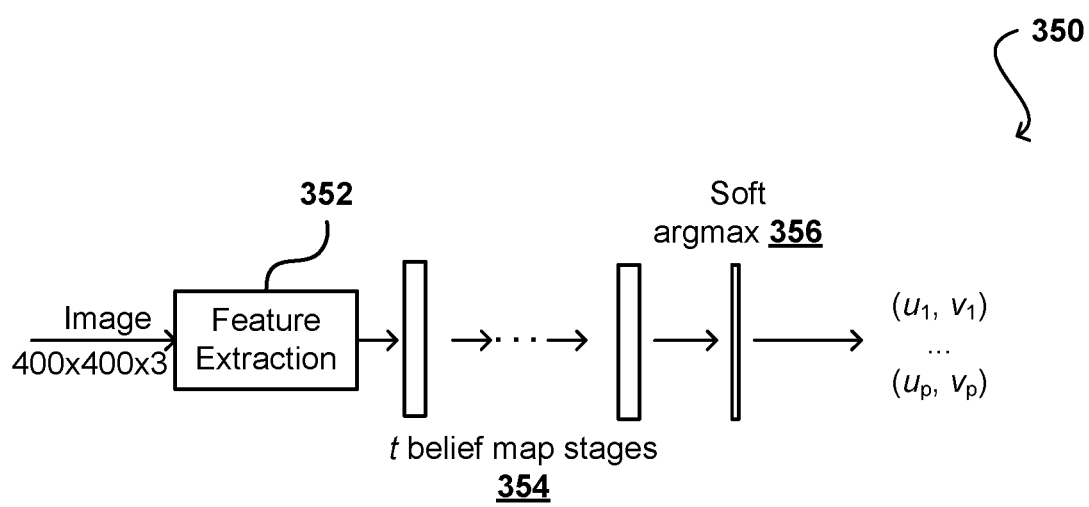

As mentioned, in some embodiments a camera can acquire a live video feed of a scene, from which a pair of networks can infer the positions and relationships of objects in the scene in real time. The resulting percepts can be fed to another network that generates a plan to explain how to recreate those percepts. Finally, an execution network reads the plan and generates actions for the robot, taking into account the current state of the world in order to ensure robustness to external disturbances. Given a single image, a perception network can infer the locations of objects in the scene and their relationships. These networks can perform object detection with pose estimation, as well as relationship inference. Each object of interest can be modeled, such as by a bounding cuboid consisting of up to seven visible vertices and one hidden vertex. Rather than directly mapping from images to object world coordinates, the network can output values in the image coordinate system. This makes the system robust to changes in camera position and orientation, as well as making it independent of the contents of the background of the scene (e.g., it does not need to see a table of a particular size). Using image coordinates also makes the results easier to visualize. FIG. 3B illustrates components of one such network architecture 350. In such architecture, feature extraction 352 consists of the first ten layers of a network pre-trained on, for example, ImageNet. The output of these layers can be fed into a series oft belief map stages 354. Each stage in this example is a series of convolutional/ReLU layers with weights that are learned during training. These stages output belief maps for each vertex, with increasingly larger receptive fields to capture more of the surrounding context and resolve ambiguity. These stages are illustrated for the prediction of a single vertex. The L2 loss between the predicted belief maps and the ground truth of the training data can be utilized. Applying the loss at each stage (also known as intermediate supervision avoids the vanishing gradient problem by restoring the gradients at each stage. Each belief map can be treated as a probability mass function for the location of a vertex in the image domain. To obtain image coordinates, soft argmax 356 is applied along the rows and columns of the final belief map.

Figure 2D:
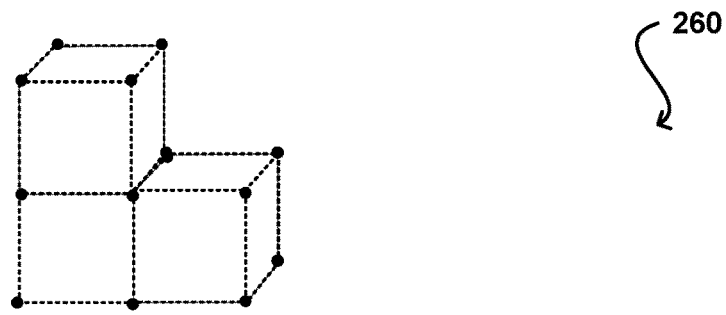

As mentioned, an example of cuboid object detection is illustrated in the state 260 of FIG. 2D. The image-centric representation makes it easy to visualize whether the object has been detected accurately. In addition, detecting the individual vertices yields a rich representation to facilitate estimation of the full pose of the object. By training on instances of occluded objects, the network learns to detect the object even when it is severely occluded, as shown in the figure.

After objects have been detected, their relationships can be inferred. This is accomplished via a fully connected neural network. The inputs to the network are the image coordinates of the vertices of two detected cuboids, and the output is a symbol from a set of relationships, such as the set {ABOVE, LEFT, NONE}. This set is rich enough to allow the system to build not only stacks of cubes but also more complicated structures such as pyramids. With n detected objects, the pairwise network can be run multiple times to generate the full state of the scene from a single image. The relationship network can be trained on the vertex coordinates of the simulated data mentioned above with a cross-entropy loss function. To make the network more robust to real-world noisy inputs, these coordinates can be perturbed by randomly swapping vertices to another vertex within the same object and adding Gaussian noise to the observed vertex coordinates. Moreover, occluded vertices can be randomly relocated using a uniform distribution within the convex hull of the occluder.

As mentioned, a primary purpose of various embodiments is to learn a human-readable program from a real-world demonstration. While a sensor such as a camera watches the scene, an agent (such as a person) can move the objects or perform the actions. As the demonstration is being performed, the perception network detects the objects and their relationships. Once the demonstration is complete, the state tensor from the relationship inference is thresholded to yield a set of discrete relationships between the objects. This tensor is sent to a program generation network which outputs a human-readable plan to execute.

Such a framework can assume that the demonstration involves a sequence of pick-and-place operations in some embodiments. Each step of the program can therefore be represented as a binary array of values indicating which of then objects (or none) is the source (the object to be picked), and which of the n objects (or none) is the target (the object upon which the picked object is to be placed). Since with n objects, there are at most n−1 steps in the program, the output of the program generation network is a tensor that, once thresholded, can be converted with relatively little effort to a human-readable program. The network can be implemented as a fully connected double-headed neural network with seven layers (one input, one output, and five hidden) in each of the two paths. The network can be trained using a mean square error (MSE) loss function with data from simulated scenes generated by enumerating possible states and corresponding plans.

Once a program has been generated, the program can be executed in an open-loop fashion by sequentially performing each step. However, in order to allow recovery from manipulation mistakes, or to handle external disturbances, a network can be used to guide execution. This execution network is fully connected, such as with two inputs, one output, and five hidden layers. It takes as input the program (represented as a first tensor) and the current state of the scene (represented as a second tensor), and it returns the next action to take. This action is represented by an array of values indicating the source and target objects, along with an array indicating the relationship to achieve (e.g., place one object on top of another). The execution network can be trained on synthetic data generated by randomly sampling among the possible programs and states, with an MSE loss function.

The different networks presented can be linked together to create a combined system for learning by demonstration. The human demonstrates a task, from which the system infers a program. Once the demonstration is complete, the objects may be shuffled on the working surface to change the initial conditions, and the robot can then execute the program in a closed loop manner, correcting mistakes when operations fail or perturbations are introduced.

Figure 4:
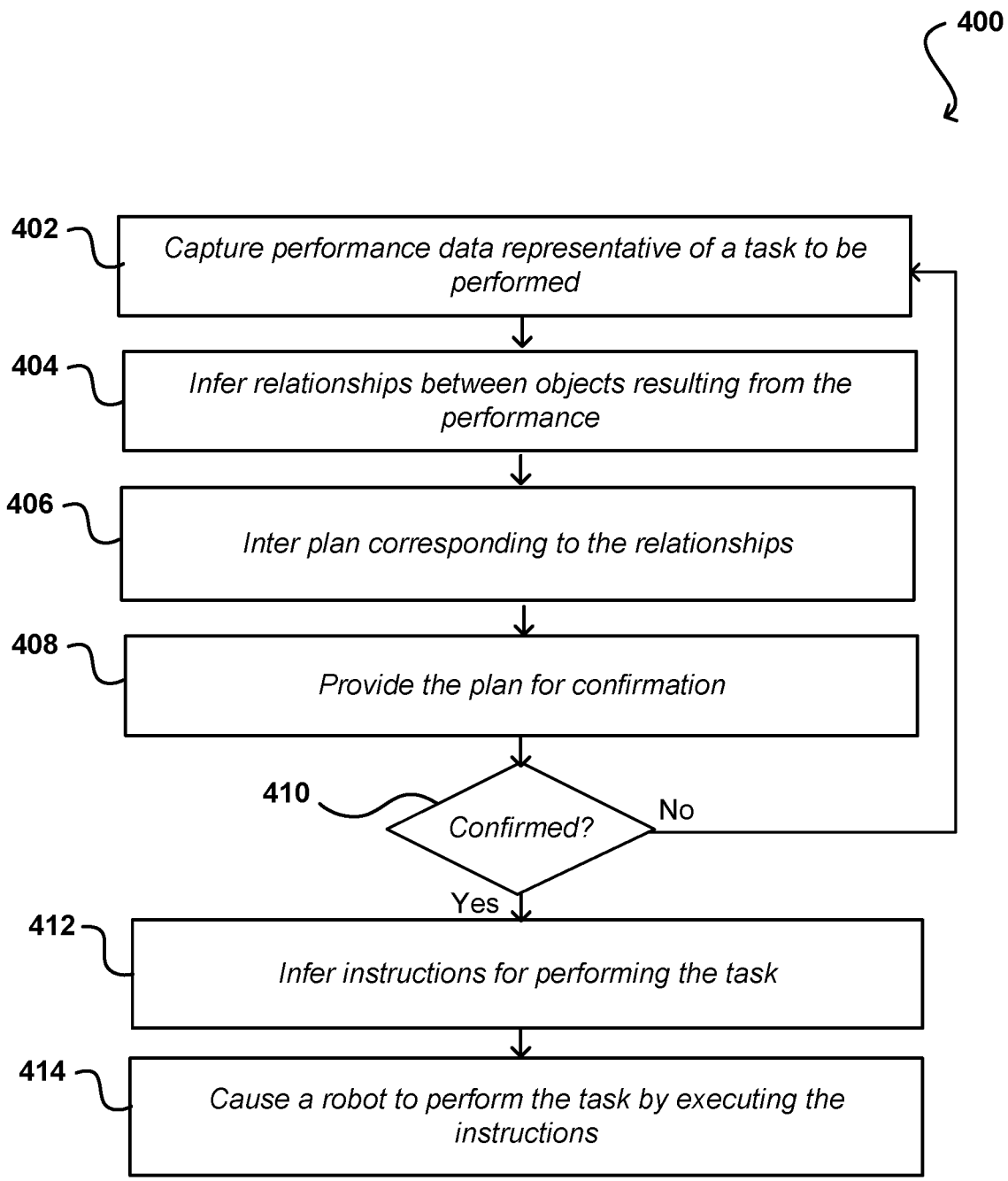
FIG. 4 illustrates an example process for generating plans and enabling robotic devices to perform tasks corresponding to those plans that can be utilized in accordance with various embodiments.

FIG. 4 illustrates an example process 400 for u . . . that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a request to train a robot is received. During a training process, performance data is captured 402 or otherwise obtained or received that is representative of a task to be performed at least partially in the physical world. As mentioned, this can include image data captured by at least one camera, among other such options. The image data, after any pre-processing, can be fed to a perception neural network that can be used to infer 404 relationships between objects as a result of the demonstrated performance. This can include utilizing an object detection network and a relationship inference network in at least some embodiments.

The relationship data can be provided as input to a plan generation network that can utilize the relationship data to infer 406 a human-readable plan corresponding to the relationships. As mentioned, this can include a number of steps defining intended or observed relationships, and can be described using words from a predefined vocabulary. The human-readable plan can then be provided 408, or otherwise made available to, a human for confirmation. A determination can be made 410 as to whether the plan is confirmed to be correct. If not, a correction can be made, such as by making a manual adjustment or by causing the camera to capture additional data of another demonstration of the task, among other such options. Once a plan is obtained that is confirmed to be correct, the plan (and any other relevant data) can be provided to an execution network that can use the plan to infer 412 instructions for performing the task, where those instructions are appropriate for the robot or autonomous device to perform the task, or able to be read by a computer instructing such performance, among other such options. A robot or other device or system can then be caused 414 to perform the task using the generated instructions.

As mentioned, various embodiments take advantage of machine learning. As an example, deep neural networks (DNNs) developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand. Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, a computing platform can deliver performance required for deep neural network-based artificial intelligence and machine learning applications.

Figure 5:
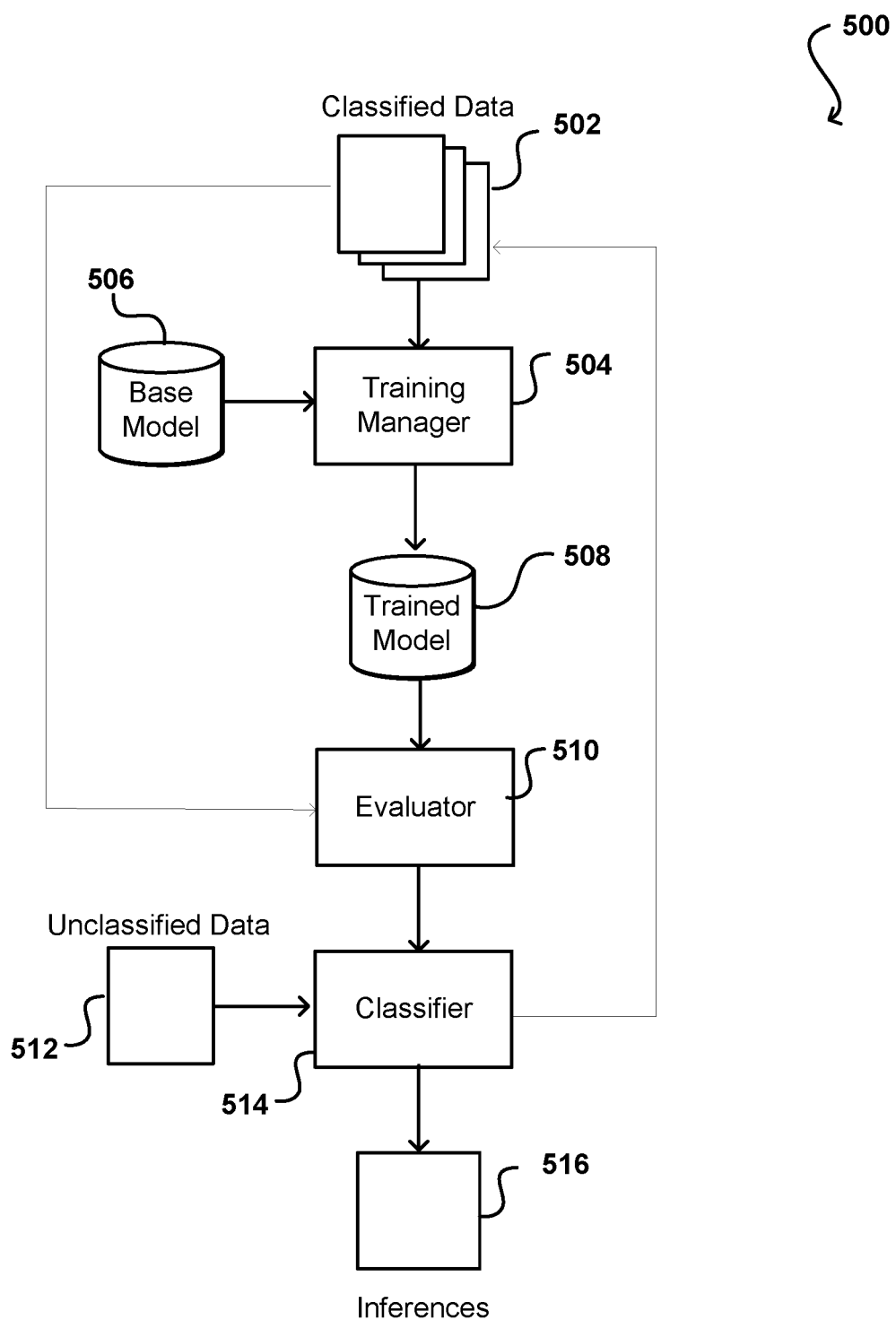
FIG. 5 illustrates an example system for training an image synthesis network that can be utilized in accordance with various embodiments.

FIG. 5 illustrates an example system 500 that can be used to classify data, or generate inferences, in accordance with various embodiments. Various predictions, labels, or other outputs can be generated for input data as well, as should be apparent in light of the teachings and suggestions contained herein. Further, both supervised and unsupervised training can be used in various embodiments discussed herein. In this example, a set of classified data 502 is provided as input to function as training data. The classified data can include instances of at least one type of object for which a statistical model is to be trained, as well as information that identifies that type of object. For example, the classified data might include a set of images that each includes a representation of a type of object, where each image also includes, or is associated with, a label, metadata, classification, or other piece of information identifying the type of object represented in the respective image. Various other types of data may be used as training data as well, as may include text data, audio data, video data, and the like. The classified data 502 in this example is provided as training input to a training manager 504. The training manager 504 can be a system or service that includes hardware and software, such as one or more computing devices executing a training application, for training the statistical model. In this example, the training manager 504 will receive an instruction or request indicating a type of model to be used for the training. The model can be any appropriate statistical model, network, or algorithm useful for such purposes, as may include an artificial neural network, deep learning algorithm, learning classifier, Bayesian network, and the like. The training manager 504 can select a base model, or other untrained model, from an appropriate repository 506 and utilize the classified data 502 to train the model, generating a trained model 508 that can be used to classify similar types of data. In some embodiments where classified data is not used, the appropriate based model can still be selected for training on the input data per the training manager.

The model can be trained in a number of different ways, as may depend in part upon the type of model selected. For example, in one embodiment a machine learning algorithm can be provided with a set of training data, where the model is a model artifact created by the training process. Each instance of training data contains the correct answer (e.g., classification), which can be referred to as a target or target attribute. The learning algorithm finds patterns in the training data that map the input data attributes to the target, the answer to be predicted, and a machine learning model is output that captures these patterns. The machine learning model can then be used to obtain predictions on new data for which the target is not specified.

In one example, a training manager can select from a set of machine learning models including binary classification, multiclass classification, and regression models. The type of model to be used can depend at least in part upon the type of target to be predicted. Machine learning models for binary classification problems predict a binary outcome, such as one of two possible classes. A learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In order to train a machine learning model in accordance with one embodiment, the training manager must determine the input training data source, as well as other information such as the name of the data attribute that contains the target to be predicted, required data transformation instructions, and training parameters to control the learning algorithm. During the training process, a training manager in some embodiments may automatically select the appropriate learning algorithm based on the type of target specified in the training data source. Machine learning algorithms can accept parameters used to control certain properties of the training process and of the resulting machine learning model. These are referred to herein as training parameters. If no training parameters are specified, the training manager can utilize default values that are known to work well for a large range of machine learning tasks. Examples of training parameters for which values can be specified include the maximum model size, maximum number of passes over training data, shuffle type, regularization type, learning rate, and regularization amount. Default settings may be specified, with options to adjust the values to fine-tune performance.

The maximum model size is the total size, in units of bytes, of patterns that are created during the training of model. A model may be created of a specified size by default, such as a model of 100 MB. If the training manager is unable to determine enough patterns to fill the model size, a smaller model may be created. If the training manager finds more patterns than will fit into the specified size, a maximum cut-off may be enforced by trimming the patterns that least affect the quality of the learned model. Choosing the model size provides for control of the trade-off between the predictive quality of a model and the cost of use. Smaller models can cause the training manager to remove many patterns to fit within the maximum size limit, affecting the quality of predictions. Larger models, on the other hand, may cost more to query for real-time predictions. Larger input data sets do not necessarily result in larger models because models store patterns, not input data; if the patterns are few and simple, the resulting model will be small. Input data that has a large number of raw attributes (input columns) or derived features (outputs of the data transformations) will likely have more patterns found and stored during the training process.

In some embodiments, the training manager can make multiple passes or iterations over the training data to discover patterns. There may be a default number of passes, such as ten passes, while in some embodiments up to a maximum number of passes may be set, such as up to one hundred passes. In some embodiments there may be no maximum set, or there may be a convergence or other criterion set which will trigger an end to the training process. In some embodiments the training manager can monitor the quality of patterns (i.e., the model convergence) during training, and can automatically stop the training when there are no more data points or patterns to discover. Data sets with only a few observations may require more passes over the data to obtain higher model quality. Larger data sets may contain many similar data points, which can reduce the need for a large number of passes. The potential impact of choosing more data passes over the data is that the model training can takes longer and cost more in terms of resources and system utilization.

In some embodiments the training data is shuffled before training, or between passes of the training. The shuffling in many embodiments is a random or pseudo-random shuffling to generate a truly random ordering, although there may be some constraints in place to ensure that there is no grouping of certain types of data, or the shuffled data may be reshuffled if such grouping exists, etc. Shuffling changes the order or arrangement in which the data is utilized for training so that the training algorithm does not encounter groupings of similar types of data, or a single type of data for too many observations in succession. For example, a model might be trained to predict a product type, where the training data includes movie, toy, and video game product types. The data might be sorted by product type before uploading. The algorithm can then process the data alphabetically by product type, seeing only data for a type such as movies first. The model will begin to learn patterns for movies. The model will then encounter only data for a different product type, such as toys, and will try to adjust the model to fit the toy product type, which can degrade the patterns that fit movies. This sudden switch from movie to toy type can produce a model that does not learn how to predict product types accurately. Shuffling can be performed in some embodiments before the training data set is split into training and evaluation subsets, such that a relatively even distribution of data types is utilized for both stages. In some embodiments the training manager can automatically shuffle the data using, for example, a pseudo-random shuffling technique.

When creating a machine learning model, the training manager in some embodiments can enable a user to specify settings or apply custom options. For example, a user may specify one or more evaluation settings, indicating a portion of the input data to be reserved for evaluating the predictive quality of the machine learning model. The user may specify a recipe that indicates which attributes and attribute transformations are available for model training. The user may also specify various training parameters that control certain properties of the training process and of the resulting model.

Once the training manager has determined that training of the model is complete, such as by using at least one end criterion discussed herein, the trained model 508 can be provided for use by a classifier 514 in classifying unclassified data 512. In many embodiments, however, the trained model 508 will first be passed to an evaluator 510, which may include an application or process executing on at least one computing resource for evaluating the quality (or another such aspect) of the trained model. The model is evaluated to determine whether the model will provide at least a minimum acceptable or threshold level of performance in predicting the target on new and future data. Since future data instances will often have unknown target values, it can be desirable to check an accuracy metric of the machine learning on data for which the target answer is known, and use this assessment as a proxy for predictive accuracy on future data.

In some embodiments, a model is evaluated using a subset of the classified data 502 that was provided for training. The subset can be determined using a shuffle and split approach as discussed above. This evaluation data subset will be labeled with the target, and thus can act as a source of ground truth for evaluation. Evaluating the predictive accuracy of a machine learning model with the same data that was used for training is not useful, as positive evaluations might be generated for models that remember the training data instead of generalizing from it. Once training has completed, the evaluation data subset is processed using the trained model 508 and the evaluator 510 can determine the accuracy of the model by comparing the ground truth data against the corresponding output (or predictions/observations) of the model. The evaluator 510 in some embodiments can provide a summary or performance metric indicating how well the predicted and true values match. If the trained model does not satisfy at least a minimum performance criterion, or other such accuracy threshold, then the training manager 504 can be instructed to perform further training, or in some instances try training a new or different model, among other such options. If the trained model 508 satisfies the relevant criteria, then the trained model can be provided for use by the classifier 514.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources, but has failed to generalize the patterns in the data. Overfitting often occurs when the training data includes all of the data used in the evaluation. A model that has been over fit may perform well during evaluation, but may fail to make accurate predictions on new or otherwise unclassified data. To avoid selecting an over fitted model as the best model, the training manager can reserve additional data to validate the performance of the model. For example, the training data set might be divided into 60 percent for training, and 40 percent for evaluation or validation, which may be divided into two or more stages. After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary classification, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances.

In the example system 500 of FIG. 5, the trained model 510 after evaluation is provided, or made available, to a classifier 514 that is able to use the trained model to process unclassified data. This may include, for example, data received from users or third parties that are not classified, such as query images that are looking for information about what is represented in those images. The unclassified data can be processed by the classifier using the trained model, and the results 516 (i.e., the classifications or predictions) that are produced can be sent back to the respective sources or otherwise processed or stored. In some embodiments, and where such usage is permitted, the now classified data instances can be stored to the classified data repository, which can be used for further training of the trained model 508 by the training manager. In some embodiments the model will be continually trained as new data is available, but in other embodiments the models will be retrained periodically, such as once a day or week, depending upon factors such as the size of the data set or complexity of the model.

The classifier can include appropriate hardware and software for processing the unclassified data using the trained model. In some instances the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 100 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

Figure 6:
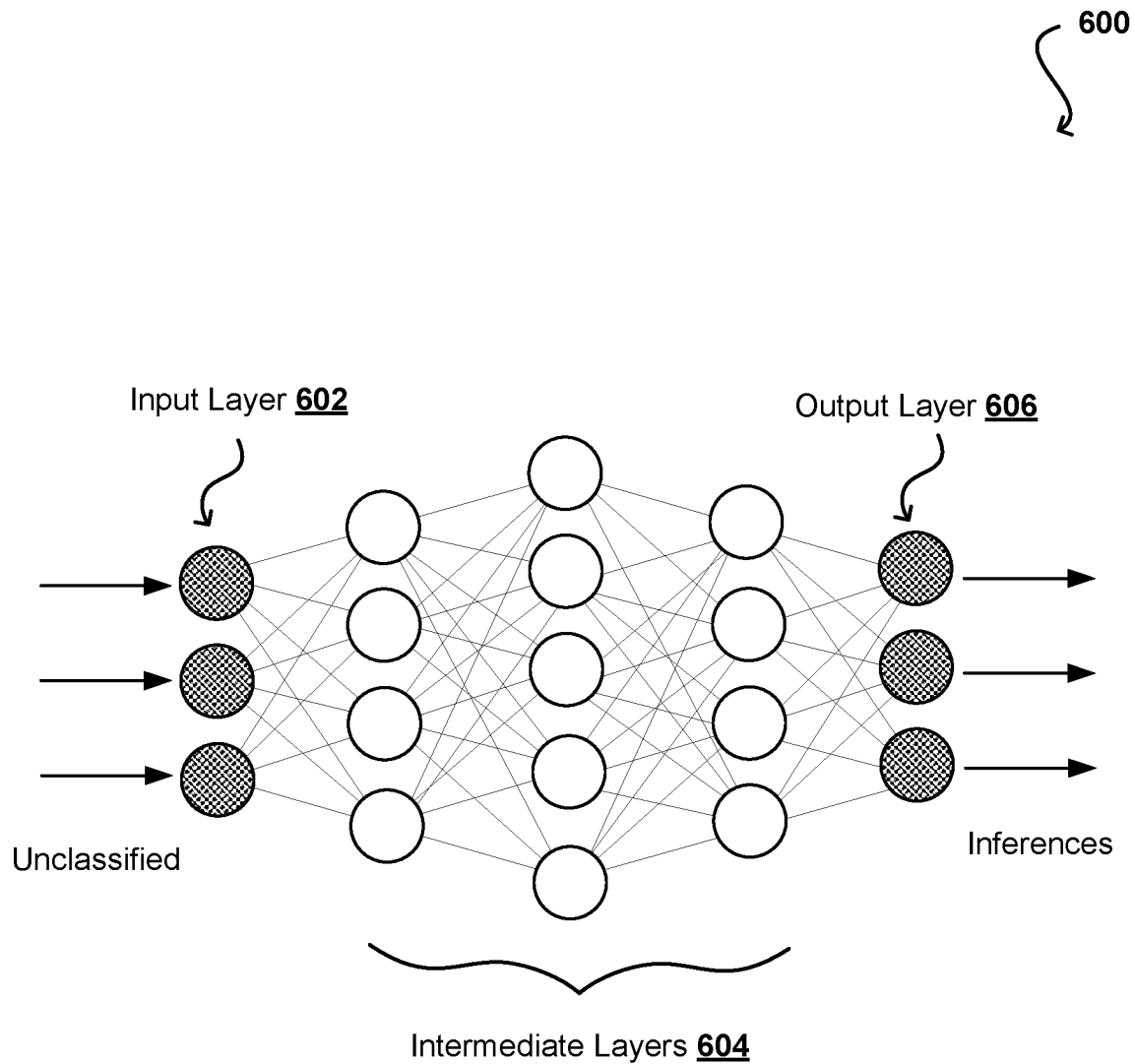
FIG. 6 illustrates layers of an example statistical model that can be utilized in accordance with various embodiments.

FIG. 6 illustrates an example neural network 600, or other statistical model, that can be utilized in accordance with various embodiments. In this example the statistical model is an artificial neural network (ANN) that includes a multiple layers of nodes, including an input layer 602, an output layer 606, and multiple layers 604 of intermediate nodes, often referred to as "hidden" layers, as the internal layers and nodes are typically not visible or accessible in conventional neural networks. As discussed elsewhere herein, there can be additional types of statistical models used as well, as well as other types of neural networks including other numbers of selections of nodes and layers, among other such options. In this network, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (in other words, translating words to vectors), CNN architecture definition (for example, filter sizes, number of filters), stochastic gradient descent parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters.

A parameter for filter sizes can represent an interpretation of the information that corresponds to the size of an instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Figure 7:
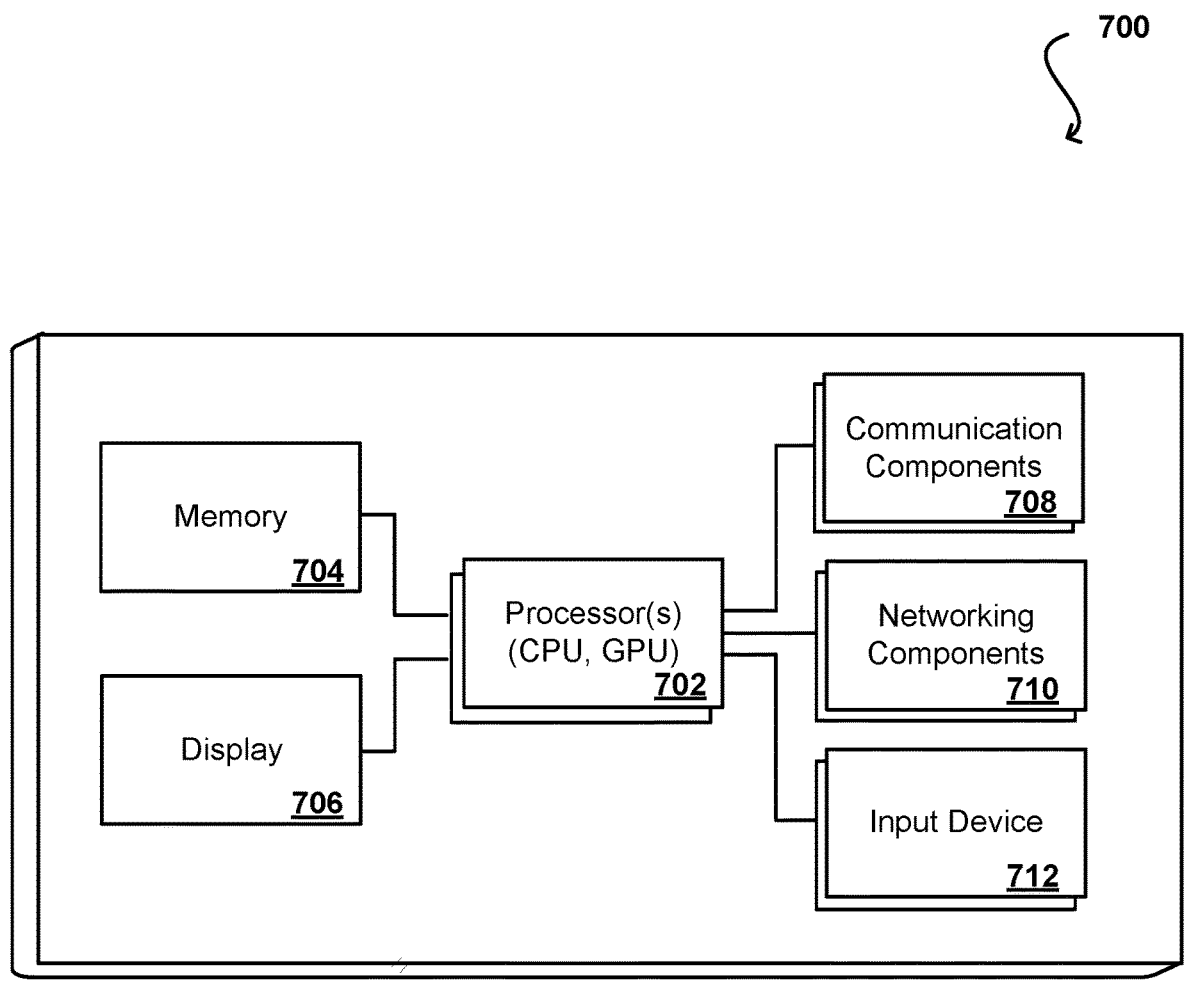
FIG. 7 illustrates example components of a computing device that can be used to implement aspects of the various embodiments.

FIG. 7 illustrates a set of basic components of a computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the processor 702, the same or separate storage can be used for images or data, a removable memory can be available for sharing information with other devices, and any number of communication approaches can be available for sharing with other devices. The device typically will include some type of display element 706, such as a touch screen, organic light emitting diode (OLED) or liquid crystal display (LCD), although devices such as portable media players might convey information via other means, such as through audio speakers. As discussed, the device in many embodiments will include at least communication component 708 and/or networking components 710, such as may support wired or wireless communications over at least one network, such as the Internet, a local area network (LAN), Bluetooth®, or a cellular network, among other such options. The components can enable the device to communicate with remote systems or services. The device can also include at least one additional input device 712 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP or FTP. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Python, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

Compared with conventional approaches, an example approach presented herein leverage real-world (as opposed to virtual reality) demonstrations, which is more natural for a user. It also generates human-readable plans, unlike those of the recent work. Compared with conventional techniques, the system uses neural networks (as opposed to classical techniques), and our system operates in 3D (rather than just 2D). Compared with other recent work, the system includes perception, learning, and execution modules as separate neural networks (as opposed to a hierarchical neural program). Our system is able to perceive objects in 3D even with significant occlusion, clutter, and pose variation.

Figure 8:
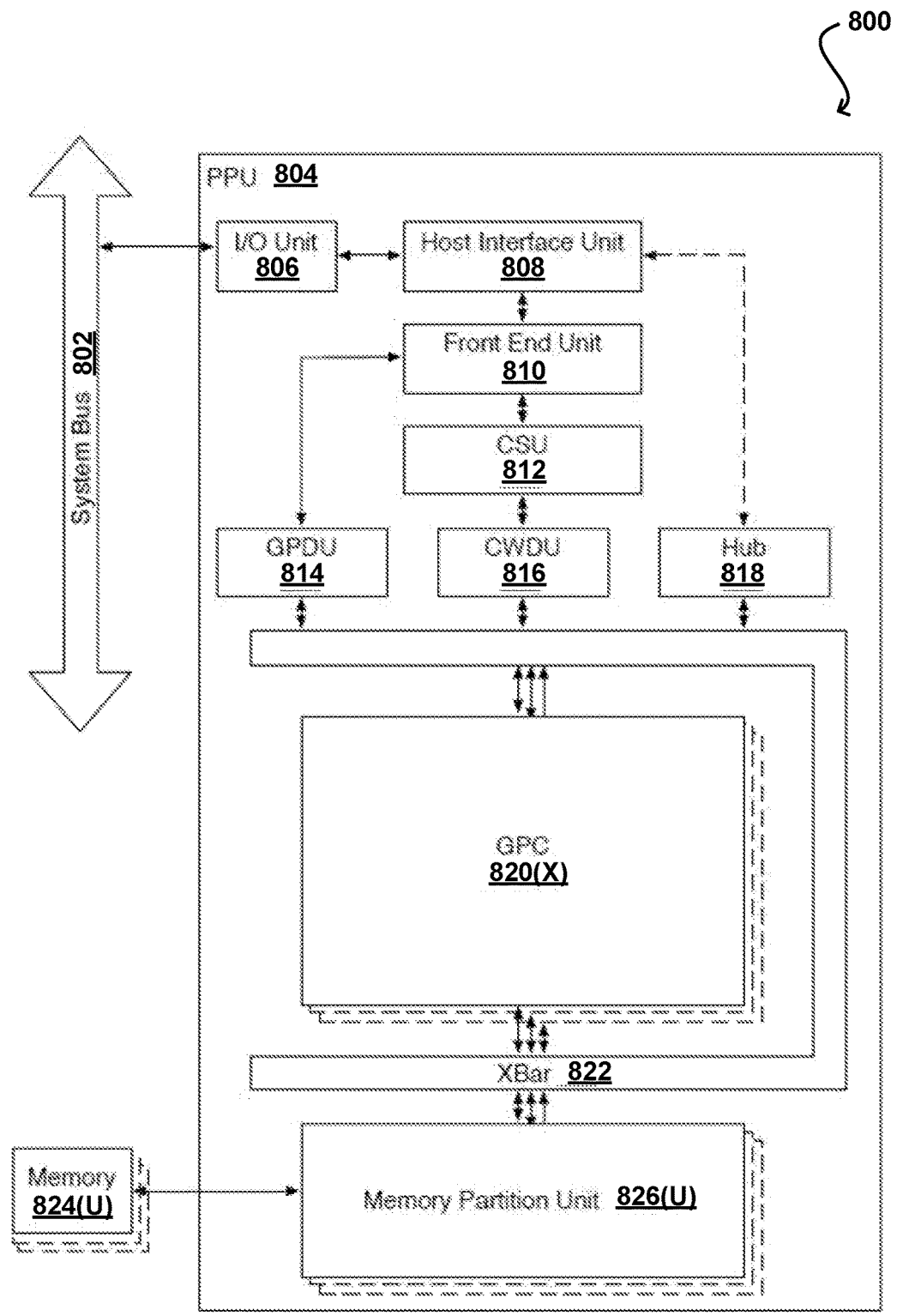
FIG. 8 illustrates a parallel processing unit that can be utilized in accordance with various embodiments.

FIG. 8 illustrates a system 800 including a parallel processing unit (PPU) 804, in accordance with one embodiment. In one embodiment, the PPU 804 is a multi-threaded processor that is implemented on one or more integrated circuit devices. The PPU 804 is a latency hiding architecture designed to process a large number of threads in parallel. A thread (i.e., a thread of execution) is an instantiation of a set of instructions configured to be executed by the PPU 804. In one embodiment, the PPU 804 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 804 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

The PPU 804 can include an Input/Output (I/O) unit 806, a host interface unit 808, a front end unit 810, a compute scheduler unit (CSU) 812, a compute work distribution unit (CWDU) 816, a graphics primitive distribution unit (GPDU) 814, a hub 818, a crossbar (Xbar) 822, one or more general processing clusters (GPCs) 820, and one or more memory partition units 826. The PPU 804 may be connected to a host processor or other peripheral devices via a system bus 802. The PPU 804 may also be connected to a local memory comprising a number of memory devices 824. In one embodiment, the local memory may comprise a number of dynamic random access memory (DRAM) devices.

The I/O unit 806 is configured to transmit and receive communications (i.e., commands, data, etc.) from a host processor (not shown) over the system bus 802. The I/O unit 205806 may communicate with the host processor directly via the system bus 202 or through one or more intermediate devices such as a memory bridge. In one embodiment, the I/O unit 205806 implements a Peripheral Component Interconnect Express (PCIe) interface for communications over a PCIe bus. In alternative embodiments, the I/O unit 806 may implement other types of well-known interfaces for communicating with external devices.

The I/O unit 806 is coupled to a host interface unit 808 that decodes packets received via the system bus 802. In one embodiment, the packets represent commands configured to cause the PPU 804 to perform various operations. The host interface unit 808 transmits the decoded commands to various other units of the PPU 804 as the commands may specify. For example, some commands may be transmitted to the front end unit 810. Other commands may be transmitted to the hub 818 or other units of the PPU 804 such as one or more copy engines, a video encoder, a video decoder, a power management unit, etc. (not explicitly shown). In other words, the host interface unit 808 is configured to route communications between and among the various logical units of the PPU 804.

In one embodiment, a program executed by the host processor encodes a command stream in a buffer that provides workloads to the PPU 804 for processing. A workload may comprise a number of instructions and pointers to data to be processed by those instructions. The buffer is a region in a memory that is accessible (i.e., read/write) by both the host processor and the PPU 804. For example, the host interface unit 808 may be configured to access the buffer in a system memory connected to the system bus 802 via memory requests transmitted over the system bus 802 by the I/O unit 806. In one embodiment, the host processor writes the command stream to the buffer and then transmits a pointer to the start of the command stream to the PPU 804. The host interface unit 808 manages the scheduling of instructions from one or more command streams written by the host processor (i.e., channels) on the various sub-units of the PPU 804.

The front end unit 810 receives instructions from the host interface unit 808 from one or more command streams and forwards those instructions to the correct sub-unit of the PPU 804. Instructions associated with a compute pipeline may be received by the front end unit 810. These compute instructions are then forwarded to a compute scheduler unit 812. The compute scheduler unit 812 is configured to track state information related to the various tasks managed by the compute scheduler unit 812. The state may indicate which GPC 820 a task is assigned to, whether the task is active or inactive, a priority level associated with the task, and so forth. The compute scheduler unit 812 manages the execution of a plurality of tasks on the one or more GPCs 820.

The compute scheduler unit 812 is coupled to a compute work distribution unit 816 that is configured to dispatch tasks for execution on the GPCs 820. The compute work distribution unit 816 may track a number of scheduled tasks received from the compute scheduler unit 812. In one embodiment, the compute work distribution unit 816 manages a pending task pool and an active task pool for each of the GPCs 820. The pending task pool may comprise a number of slots (e.g., 16 slots) that contain tasks assigned to be processed by a particular GPC 820. The active task pool may comprise a number of slots (e.g., 4 slots) for tasks that are actively being processed by the GPCs 820. As a GPC 820 finishes the execution of a task, that task is evicted from the active task pool for the GPC 820 and one of the other tasks from the pending task pool is selected and scheduled for execution on the GPC 820. If an active task has been idle on the GPC 820, such as while waiting for a data dependency to be resolved, then the active task may be evicted from the GPC 820 and returned to the pending task pool while another task in the pending task pool is selected and scheduled for execution on the GPC 820.

Returning to the front end unit 810, instructions associated with a graphics pipeline may be received by the front end unit 810. These graphics instructions are then forwarded to a graphics primitive distribution unit 814. The graphics primitive distribution unit 814 fetches vertex data from the memory 824 or the system memory via the system bus 802 for various graphics primitives. Graphics primitives may include points, lines, triangles, quads, triangle strips, and the like. The graphics primitive distribution unit 814 groups the vertices into batches of primitives and dispatches tasks to the GPCs 820 for processing the batches of primitives. Processing may involve executing a shader (i.e., a Vertex Shader, Tesselation Shader, Geometry Shader, etc.) on a programmable processing unit as well as performing fixed function operations on the vertices such as clipping, culling, and viewport transformation using a fixed function unit.

The compute work distribution unit 816 and the graphics primitive distribution unit 814 communicate with the one or more GPCs 820 via an XBar 822. The XBar 822 is an interconnect network that couples many of the units of the PPU 804 to other units of the PPU 804. For example, the XBar 822 may be configured to couple the compute work distribution unit 816 to a particular GPC 820. Although not shown explicitly, one or more other units of the PPU 804 are coupled to the host unit. The other units may also be connected to the XBar 822 via a hub 818.

The tasks associated with the compute pipeline are managed by the compute scheduler unit 812 and dispatched to a GPC 820 by the compute work distribution unit 816. The tasks associated with the graphics pipeline are managed and distributed to a GPC 820 by the graphics primitive distribution unit 814. The GPC 820 is configured to process the tasks and generate results. The results may be consumed by other tasks within the GPC 820, routed to a different GPC 820 via the XBar 822, or stored in the memory 824. The results can be written to the memory 824 via the memory partition units 826, which implement a memory interface for reading and writing data to/from the memory 824. In one embodiment, the PPU 804 includes a number U of memory partition units 826 that is equal to the number of separate and distinct memory devices 824 coupled to the PPU 804. A memory partition unit 826 is described in more detail below.

In one embodiment, a host processor executes a driver kernel that implements an application programming interface (API) that enables one or more applications executing on the host processor to schedule operations for execution on the PPU 804. An application may generate instructions (i.e., API calls) that cause the driver kernel to generate one or more tasks for execution by the PPU 804. The driver kernel outputs tasks to one or more streams being processed by the PPU 804. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises thirty-two related threads.

Figure 9:
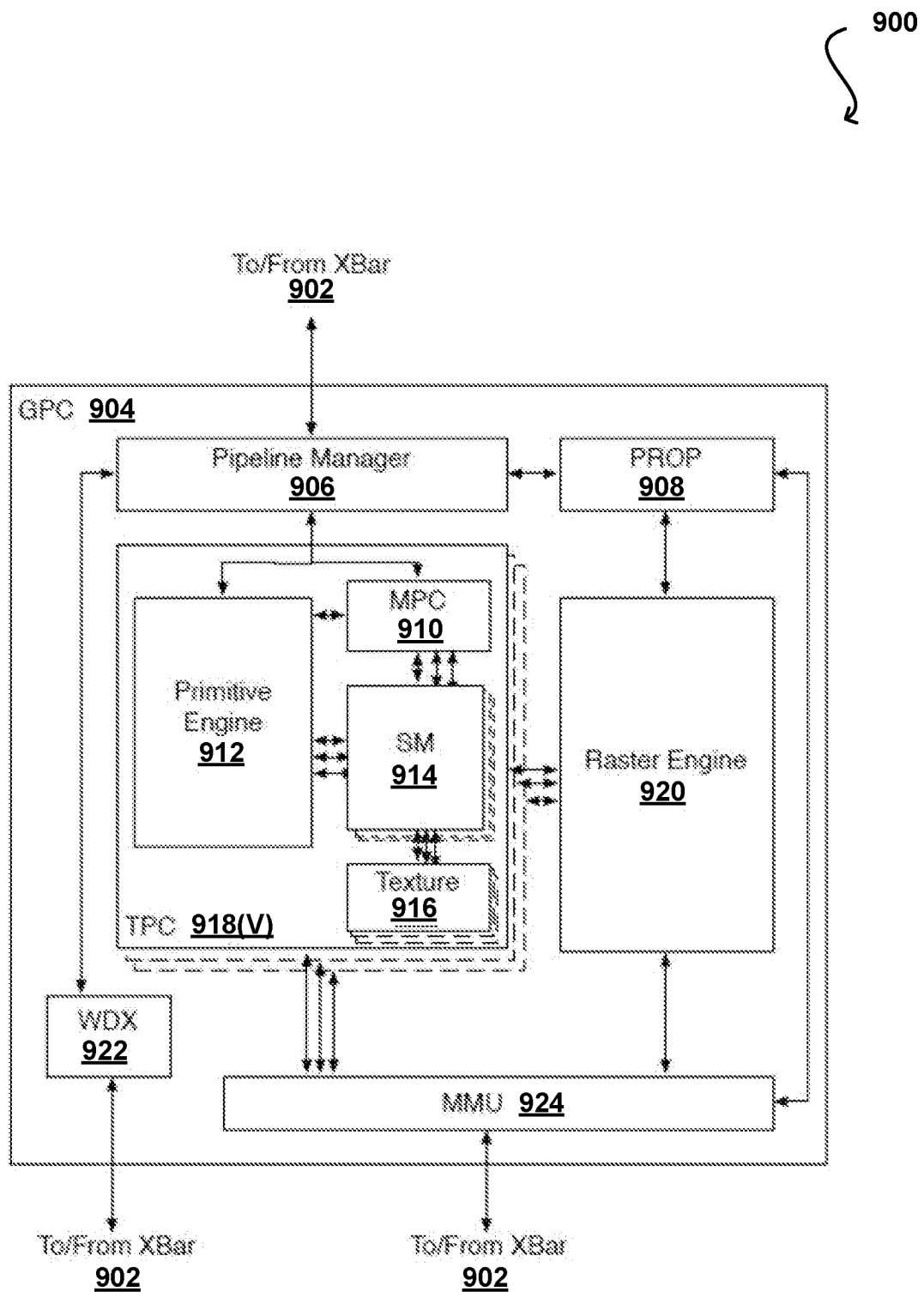
FIG. 9 illustrates a general processing cluster of a parallel processing unit that can be utilized in accordance with various embodiments.

FIG. 9 illustrates an example GPC 904 of a PPU in accordance with one embodiment. Each GPC 904 includes a number of hardware units for processing tasks. In one embodiment, each GPC 904 includes a pipeline manager 906, a pre-raster operations unit (PROP) 908, a raster engine 920, a work distribution crossbar (WDX) 922, a memory management unit (MMU) 924, and one or more Texture Processing Clusters (TPCs) 918. It will be appreciated that the GPC 904 may include other hardware units in lieu of or in addition to the units illustrated.

In one embodiment, the operation of the GPC 904 is controlled by the pipeline manager 906. The pipeline manager 906 manages the configuration of the one or more TPCs 918 for processing tasks allocated to the GPC 904. In one embodiment, the pipeline manager 906 may configure at least one of the one or more TPCs 918 to implement at least a portion of a graphics rendering pipeline. For example, a TPC 918 may be configured to execute a vertex shader program on the programmable streaming multiprocessor (SM) 914. The pipeline manager 906 may also be configured to route packets received from the XBar 902 to the appropriate logical units within the GPC 904. For example, some packets may be routed to fixed function hardware units in the PROP 908 and/or raster engine 920 while other packets may be routed to the TPCs 918 for processing by the primitive engine 912 or the SM 914. The PROP unit 908 is configured to route data generated by the raster engine 920 and the TPCs 918 to a Raster Operations (ROP) unit in the memory partition unit, described in more detail below. The PROP unit 908 may also be configured to perform optimizations for color blending, organize pixel data, perform address translations, and the like.

The raster engine 920 includes a number of fixed function hardware units configured to perform various raster operations. In one embodiment, the raster engine 920 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may be transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 920 comprises fragments to be processed, for example, by a fragment shader implemented within a TPC 918.

Each TPC 918 included in the GPC 904 includes an M-Pipe Controller (MPC) 910, a primitive engine 912, an SM 914, and one or more texture units 916. The MPC 910 controls the operation of the TPC 918, routing packets received from the pipeline manager 906 to the appropriate units in the TPC 918. For example, packets associated with a vertex may be routed to the primitive engine 912, which is configured to fetch vertex attributes associated with the vertex from the memory. In contrast, packets associated with a shader program may be transmitted to the SM 914.

In one embodiment, the texture units 916 are configured to load texture maps (e.g., a 2D array of texels) from the memory and sample the texture maps to produce sampled texture values for use in shader programs executed by the SM 914. The texture units 916 implement texture operations such as filtering operations using mip-maps (i.e., texture maps of varying levels of detail). In one embodiment, each TPC 918 includes two (2) texture units 916.

The SM 914 comprises a programmable streaming processor that is configured to process tasks represented by a number of threads. Each SM 914 is multi-threaded and configured to execute a plurality of threads (e.g., thirty-two threads) from a particular group of threads concurrently. In one embodiment, the SM 914 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 914 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 914 may be described in more detail below in conjunction with FIG. 4.

The MMU 924 provides an interface between the GPC 904 and the memory partition unit. The MMU 924 may provide translation of virtual addresses into physical addresses, memory protection, and arbitration of memory requests. In one embodiment, the MMU 924 provides one or more translation lookaside buffers (TLBs) for improving translation of virtual addresses into physical addresses in the memory.

Figure 10:
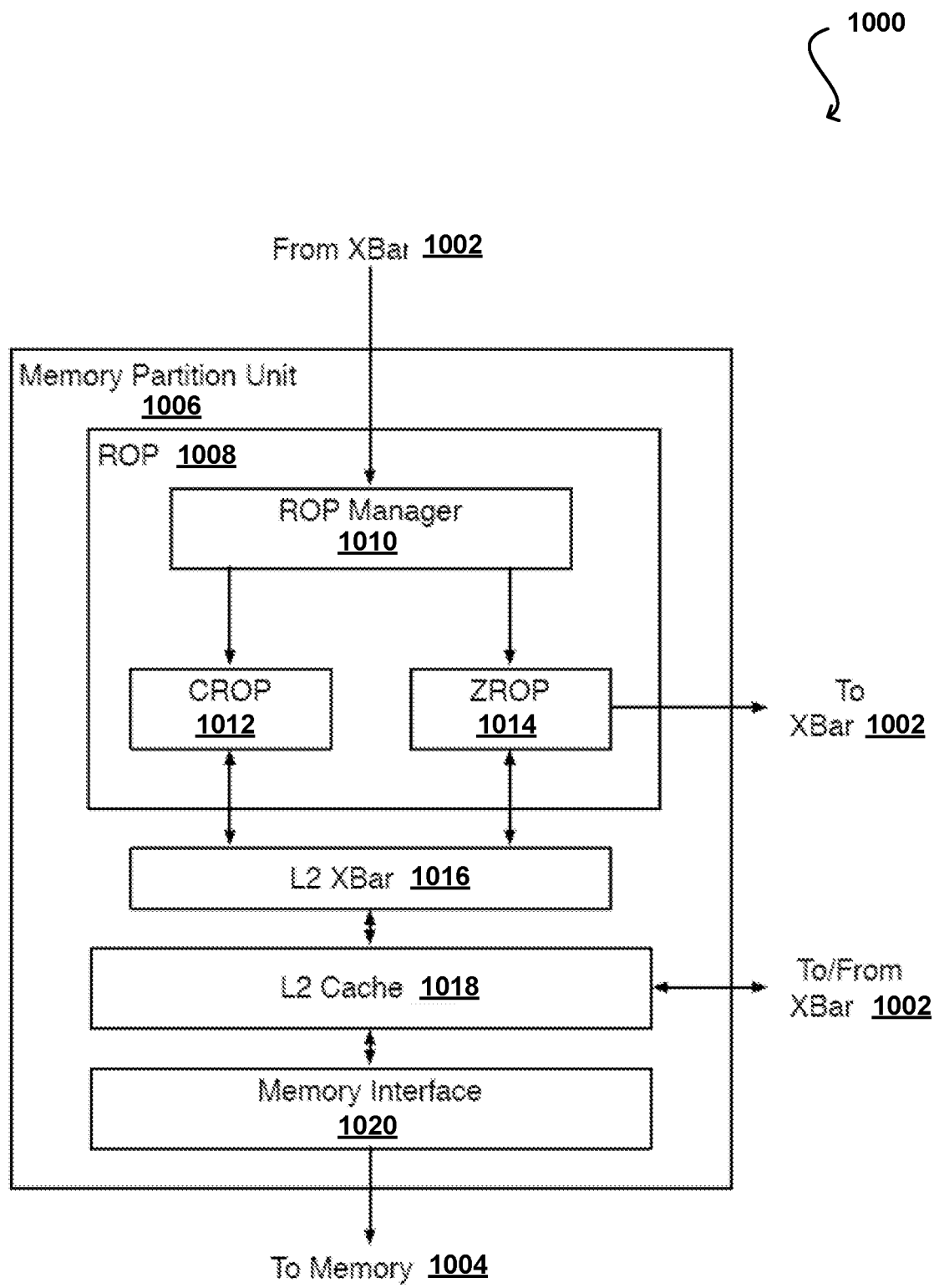
FIG. 10 illustrates and example partition unit of a parallel processing unit that can be utilized in accordance with various embodiments.

FIG. 10 illustrates a view 1000 of an example memory partition unit 1006 of a PPU in accordance with one embodiment. The memory partition unit 1006 includes a Raster Operations (ROP) unit 1008, a level two (L2) cache 1018, a memory interface 1020, and an L2 crossbar (XBar) 1016. The memory interface 1020 is coupled to the memory 1004. The memory interface 1020 may implement 16, 32, 64, or 128-bit data buses, or the like, for high-speed data transfer. In one embodiment, the PPU comprises a number of memory interfaces 1020, one memory interface 1020 per memory partition unit 1006, where each memory partition unit 1006 is connected to a corresponding memory device 1004. For example, the PPU may be connected to up to a number of memory devices, such as graphics double-data-rate, version 5, synchronous dynamic random access memory (GDDR5 SDRAM). In one embodiment, the memory interface 1020 implements a DRAM interface for six memory devices.

In one embodiment, the PPU implements a multi-level memory hierarchy. The memory 1004 is located off-chip in SDRAM coupled to the PPU. Data from the memory may be fetched and stored in the L2 cache 1018, which is located on-chip and is shared between the various GPCs. As illustrated, each memory partition unit 1006 includes a portion of the L2 cache 1018 associated with a corresponding memory device 1004. Lower level caches may then be implemented in various units within the GPCs. For example, each of the SMs may implement a level one (L1) cache. The L1 cache is private memory that is dedicated to a particular SM. Data from the L2 cache 1018 may be fetched and stored in each of the L1 caches for processing in the functional units of the SMs. The L2 cache 1018 is coupled to the memory interface 1020 and the XBar 1016.

The ROP unit 1008 includes a ROP Manager 1010, a Color ROP (CROP) unit 1012, and a Z ROP (ZROP) unit 1014. The CROP unit 1012 performs raster operations related to pixel color, such as color compression, pixel blending, and the like. The ZROP unit 1014 implements depth testing in conjunction with the raster engine. The ZROP unit 1014 receives a depth for a sample location associated with a pixel fragment from the culling engine of the raster engine. The ZROP unit 1014 tests the depth against a corresponding depth in a depth buffer for a sample location associated with the fragment. If the fragment passes the depth test for the sample location, then the ZROP unit 1014 updates the depth buffer and transmits a result of the depth test to the raster engine. The ROP Manager 1010 controls the operation of the ROP unit 1008. It will be appreciated that the number of memory partition units may be different than the number of GPCs and, therefore, each ROP unit 1008 may be coupled to each of the GPCs. Therefore, the ROP Manager 1010 tracks packets received from the different GPCs and determines the GPC to which a result generated by the ROP unit 1008 is routed. The CROP unit 1012 and the ZROP unit 1014 are coupled to the L2 cache 1018 via an L2 XBar 1016.

Figure 11:
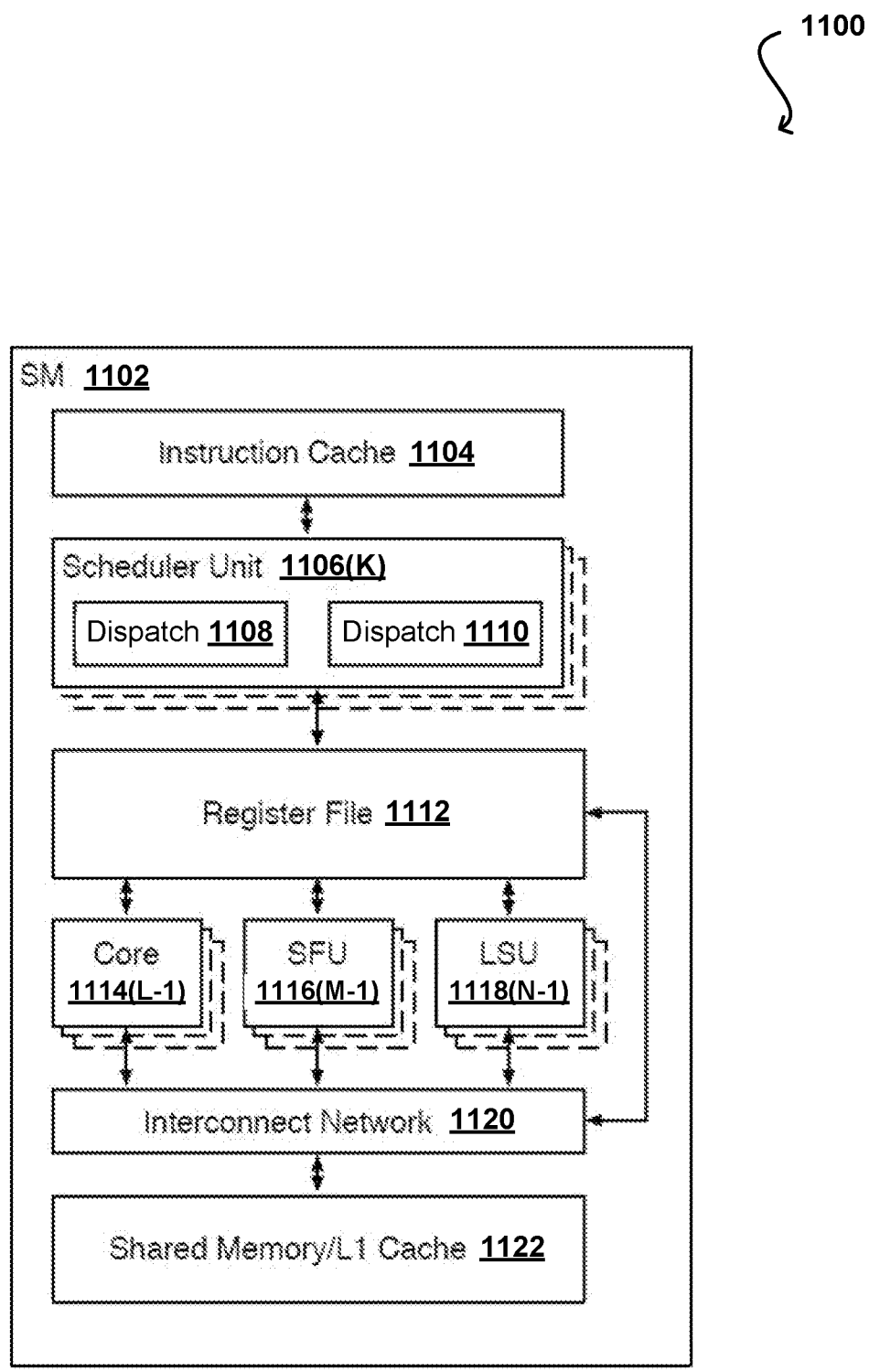
FIG. 11 illustrates an example streaming multiprocessor that can be utilized in accordance with various embodiments.

FIG. 11 illustrates an example streaming multi-processor in accordance with one embodiment. As illustrated, the SM 1102 includes an instruction cache 1104, one or more scheduler units 1106, a register file 1112, one or more processing cores 1114, one or more special function units (SFUs) 1116, one or more load/store units (LSUs) 1118, an interconnect network 1120, and a shared memory/L1 cache 1122.

As described above, the compute work distribution unit and the graphics primitive distribution unit can dispatch tasks for execution on the GPCs of the PPU. The tasks are allocated to a particular TPC within a GPC and, if the task is associated with a shader program, the task may be allocated to a specific SM 1102. A scheduler unit 1106 receives the tasks from the compute work distribution unit and the graphics primitive distribution unit and manages instruction scheduling for one or more groups of threads (i.e., warps) assigned to the SM 1102. Each SM 1102 may include K scheduler units 1106. A given scheduler unit 1106 can schedule threads for execution in groups of parallel threads, where each group is called a warp. In one embodiment, each warp includes thirty-two threads. The scheduler unit 1106 may manage a plurality of different warps, scheduling the warps for execution and then dispatching instructions from the plurality of different warps to the various functional units (i.e., cores, SFUs, and LSUs) during each clock cycle.

In one embodiment, each scheduler unit 1106 includes one or more instruction dispatch units 1108. Each dispatch unit 1108 is configured to transmit instructions to one or more of the functional units. In the embodiment illustrated, the scheduler unit 1106 includes two dispatch units 1110 that enable two different instructions from the same warp to be dispatched during each clock cycle. In alternative embodiments, each scheduler unit 1106 may include a single dispatch unit 1108 or additional dispatch units 1110.

Each SM 1102 can include a register file 1112 that provides a set of registers for the functional units of the SM 1102. In one embodiment, the register file 1112 is divided between each of the functional units such that each functional unit is allocated a dedicated portion of the register file 1112. In another embodiment, the register file 1112 is divided between the different warps being executed by the SM 1102. The register file 1112 provides temporary storage for operands connected to the data paths of the functional units.

Each SM 1102 comprises L processing cores 1114. In one embodiment, the SM includes a large number (e.g., 192, etc.) of distinct processing cores. Each core may include a fully-pipelined, single-precision processing unit that includes a floating point arithmetic logic unit and an integer arithmetic logic unit. The core may also include a double-precision processing unit including a floating point arithmetic logic unit In one embodiment, the floating point arithmetic logic units implement the IEEE 754-2008 standard for floating point arithmetic. Each SM 1102 also comprises a number of SFUs 1116 that perform special functions (e.g., pixel blending operations, and the like), and a number of LSUs 1118 that implement load and store operations between the shared memory/L1 cache 1122 and the register file 1112. In one embodiment, the SM 1102 includes 192 cores 1114, 32 SFUs 1116, and 32 LSUs 1118.

Each SM 1102 includes an interconnect network 1120 that connects each of the functional units to the register file 1112 and the shared memory/L1 cache 1122. In one embodiment, the interconnect network is a crossbar that can be configured to connect any of the functional units to any of the registers in the register file or the memory locations in shared memory/L1 cache.

The shared memory/L1 cache 1122 is an array of on-chip memory that, in one embodiment, may be configured as either shared memory or an L1 cache, or a combination of both, as the application demands. For example, the shared memory/L1 cache may comprise 64 kB of storage capacity. The shared memory/L1 cache may be configured as 64 kB of either shared memory or L1 cache, or a combination of the two such as 16 kB of L1 cache and 48 kB of shared memory. The PPU described above may be configured to perform highly parallel computations much faster than conventional CPUs. Parallel computing has advantages in graphics processing, data compression, biometrics, stream processing algorithms, and the like.

In one embodiment, the PPU comprises a graphics processing unit (GPU). The PPU can be configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU can be configured to process the graphics primitives to generate a frame buffer (i.e., pixel data for each of the pixels of the display).

An application can write model data for a scene (i.e., a collection of vertices and attributes) to a memory such as a system memory or memory. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs of the PPU including one or more of a vertex shader, hull shader, domain shader, geometry shader, and a pixel shader. For example, one or more of the SMs may be configured to execute a vertex shader program that processes a number of vertices defined by the model data. In one embodiment, the different SMs may be configured to execute different shader programs concurrently. For example, a first subset of SMs may be configured to execute a vertex shader program while a second subset of SMs may be configured to execute a pixel shader program. The first subset of SMs processes vertex data to produce processed vertex data and writes the processed vertex data to the L2 cache and/or the memory. After the processed vertex data is rasterized (i.e., transformed from three-dimensional data into two-dimensional data in screen space) to produce fragment data, the second subset of SMs executes a pixel shader to produce processed fragment data, which is then blended with other processed fragment data and written to the frame buffer in memory. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU is embodied on a single semiconductor substrate. In another embodiment, the PPU is included in a system-on-a-chip (SoC) along with one or more other logic units such as a reduced instruction set computer (RISC) CPU, a memory management unit (MMU), a digital-to-analog converter (DAC), and the like.

In one embodiment, the PPU may be included on a graphics card that includes one or more memory devices such as GDDR5 SDRAM. The graphics card may be configured to interface with a PCIe slot on a motherboard of a desktop computer that includes, e.g., a northbridge chipset and a southbridge chipset. In yet another embodiment, the PPU may be an integrated graphics processing unit (iGPU) included in the chipset (i.e., Northbridge) of the motherboard. In one embodiment, the PPU may be configured to implement and train a neural network to produce character phase value labels for motion capture data.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A processor comprising:
processing circuitry to use a first portion of one or more neural networks to detect one or more objects in one or more images and a second portion of the one or more neural networks to identify one or more spatial relationships between the one or more objects; and
cause one or more tasks to be performed based, at least in part, on the identified one or more spatial relationships.

2. The processor of claim 1, wherein the processing circuitry is further to cause one or more tasks to be performed based, at least in part, on the identified one or more spatial relationships, in substantially a same way in which the one or more tasks are observed being performed.

3. The processor of claim 1, wherein the processing circuitry is further to cause one or more tasks to be performed based, at least in part, on the identified one or more spatial relationships, in substantially a different way than the one or more tasks are observed being performed.

4. The processor of claim 1, wherein one or more tasks are performed based, at least in part, on the identified one or more spatial relationships, at least in part, by a robot, a semi-automated machine, or a human.

5. The processor of claim 1, wherein the processing circuitry is further to generate a plan including one or more steps to perform one or more tasks based, at least in part, on the identified one or more spatial relationships.

6. The processor of claim 5, wherein the one or more steps of the plan are human-readable.

7. The processor of claim 1, wherein the one or more neural networks are to identify a task being performed based, at least in part, on the identified spatial relationships.

8. A method, comprising:
using a first portion of one or more neural networks to detect one or more objects in one or more images and a second portion of the one or more neural networks to identify one or more spatial relationships between the one or more objects; and
cause one or more tasks to be performed based, at least in part, on the identified one or more spatial relationships.

9. The method of claim 8, further comprising:
causing one or more tasks to be performed based, at least in part, on the identified one or more spatial relationships, in substantially a same way in which the one or more tasks are observed being performed.

10. The method of claim 8, further comprising:
causing one or more tasks to be performed based, at least in part, on the identified one or more spatial relationships, in substantially a different way than the one or more tasks are observed being performed.

11. The method of claim 8, wherein one or more tasks are performed based, at least in part, on the identified one or more spatial relationships, at least in part, by a robot, a semi-automated machine, or a human.

12. The method of claim 8, further comprising: generating a plan including one or more steps to perform one or more tasks based, at least in part, on the identified one or more spatial relationships.

13. The method of claim 12, wherein the one or more steps of the plan are human-readable.

14. The method of claim 13, further comprising:
providing the plan, including the human-readable steps, to one or more second neural networks to generate instructions for a robotic device to perform the one or more tasks.

15. The method of claim 8, wherein the one or more neural networks are to identify a task being performed based, at least in part, on the identified one or more spatial relationships.

16. A system, comprising:
one or more cameras to capture image data of one or more motions of one or more objects; and
one or more processors to use a first portion of one or more neural networks to detect the one or more objects in the captured image data and a second portion of the one or more neural networks to identify one or more one or more spatial relationships between the one or more objects, and
cause one or more tasks to be performed based, at least in part, on the identified one or more spatial relationships.

17. The system of claim 16, wherein the one or more processors are further to cause one or more tasks to be performed based, at least in part, on the one or more identified one or more spatial relationships, in substantially a same way in which the one or more tasks are observed being performed.

18. The system of claim 16, wherein the one or more processors are further to cause one or more tasks to be performed based, at least in part, on the one or more identified one or more spatial relationships, in substantially a different way than the one or more tasks are observed being performed.

19. The system of claim 16, wherein one or more tasks are performed based, at least in part, on the one or more identified one or more spatial relationships, at least in part, by a robot, a semi-automated machine, or a human.

20. The system of claim 16, wherein the one or more processors are further to generate a plan including one or more steps to perform one or more tasks based, at least in part, on the one or more identified relationships, and wherein the one or more steps of the plan are human-readable.

\* \* \* \* \*